(12) United States Patent
Saito et al.

(10) Patent No.: US 11,498,315 B2
(45) Date of Patent: Nov. 15, 2022

(54) TRANSPARENT RESIN SUBSTRATE

(71) Applicant: FUKUVI CHEMICAL INDUSTRY CO., LTD., Fukui (JP)

(72) Inventors: Masahiro Saito, Fukui (JP); Teppei Itamoto, Fukui (JP)

(73) Assignee: FUKUVI CHEMICAL INDUSTRY CO., LTD., Fukui (JP)

( * ) Notice: Subject to any disclaimer, the term of this patent is extended or adjusted under 35 U.S.C. 154(b) by 817 days.

(21) Appl. No.: 16/472,262

(22) PCT Filed: Dec. 18, 2017

(86) PCT No.: PCT/JP2017/045291
§ 371 (c)(1),
(2) Date: Jun. 21, 2019

(87) PCT Pub. No.: WO2018/117018
PCT Pub. Date: Jun. 28, 2018

(65) Prior Publication Data
US 2019/0324173 A1    Oct. 24, 2019

(30) Foreign Application Priority Data

Dec. 22, 2016 (JP) .............................. JP2016-249494

(51) Int. Cl.
| | | |
|---|---|---|
| B32B 27/08 | (2006.01) | |
| B32B 27/20 | (2006.01) | |
| B32B 27/40 | (2006.01) | |
| C09D 183/02 | (2006.01) | |
| C09D 183/04 | (2006.01) | |
| C09D 175/14 | (2006.01) | |
| G02B 1/111 | (2015.01) | |
| G02B 1/14 | (2015.01) | |
| B05D 5/06 | (2006.01) | |
| B29D 11/00 | (2006.01) | |
| C08G 59/30 | (2006.01) | |
| C08F 299/06 | (2006.01) | |
| C08J 7/04 | (2020.01) | |
| C09D 5/00 | (2006.01) | |
| C08J 7/043 | (2020.01) | |
| C08J 7/046 | (2020.01) | |

(52) U.S. Cl.
CPC ............... *B32B 27/08* (2013.01); *C08J 7/042* (2013.01); *C08J 7/043* (2020.01); *C08J 7/046* (2020.01); *C09D 5/006* (2013.01); *C09D 175/14* (2013.01); *C09D 183/02* (2013.01); *C09D 183/04* (2013.01); *G02B 1/111* (2013.01); *G02B 1/14* (2015.01); *B05D 5/06* (2013.01); *B29D 11/00* (2013.01); *B32B 2250/24* (2013.01); *B32B 2307/412* (2013.01); *B32B 2307/418* (2013.01); *C08J 2369/00* (2013.01); *C08J 2475/14* (2013.01)

(58) Field of Classification Search
None
See application file for complete search history.

(56) References Cited

U.S. PATENT DOCUMENTS

| | | | |
|---|---|---|---|
| 9,149,962 B2 * | 10/2015 | Saito | ..................... C08J 7/043 |
| 2014/0248478 A1 | 9/2014 | Saito et al. | |
| 2016/0017173 A1 | 1/2016 | Tsukamoto | |

FOREIGN PATENT DOCUMENTS

| | | |
|---|---|---|
| JP | 2003/149403 | 5/2003 |
| JP | 2006/35778 | 2/2006 |
| JP | 2014-41244 | 3/2014 |
| JP | 2014-208743 | 11/2014 |
| JP | 5745639 | 5/2015 |
| JP | 2016-20049 | 2/2016 |
| JP | 2016-71307 | 5/2016 |
| WO | 2013/153648 | 10/2013 |

OTHER PUBLICATIONS

ISR issued in International Bureau of WIPO Patent Application No. PCT/JP2017/045291, dated Mar. 20, 2018.
English Translation of IPRP issued in International Bureau of WIPO Patent Application No. PCT/JP2017/045291, dated Jun. 25, 2019.

* cited by examiner

*Primary Examiner* — Sheeba Ahmed
(74) *Attorney, Agent, or Firm* — Greenblum & Bernstein, P.L.C.

(57) ABSTRACT

A transparent resin substrate composed of a light-transmitting resin base sheet, and an underlying layer, a hard coat layer, and an antireflection coating formed sequentially on the base sheet. The antireflection coating includes a medium refractive index layer on the hard coat layer, and a low refractive index layer on the medium refractive index layer. The underlying layer is a cured product of a hexa- or higher functional urethane acrylate monomer. The hard coat layer is a cured product of a hard coat layer composition containing a polymerizable monomer containing 50% by mass or more of a tri- or lower functional urethane acrylate monomer, silica particles, a silane coupling agent, and a metal chelate compound. The medium refractive index layer is a cured product of a medium refractive index layer composition. The low refractive index layer is a particle-free cured product of a low refractive index layer composition.

9 Claims, No Drawings

TRANSPARENT RESIN SUBSTRATE

TECHNICAL FIELD

This invention relates to a transparent resin substrate. More specifically, the invention relates to a transparent resin substrate which is provided with an antireflection coating and preferably used as an antireflection film for film insert molding.

BACKGROUND ART

Various display devices, such as personal computers, mobile phones, liquid crystal monitors, and automated teller machines (ATMs), have faced the challenge of preventing reflection or reflected glare under natural light or artificial light so as not to lower visibility. In response, various measures for solving the challenge have been taken.

One of the measures is the development of an antireflection film, and this film is stuck to the surface of the display device for attaining the intended purpose. The development of an integrally molded product having an antireflection layer on the surface is also under way.

One of methods for manufacturing the integrally molded product having the antireflection layer is film insert molding. This method is a molding method using a separately prepared film having an antireflective function (i.e., an antireflection film). This method comprises installing the antireflection film within an injection molding machine, then shaping the antireflection film into a desired shape while heating it, and then pouring and solidifying a predetermined resin to integrate the antireflection film and the resin by heat fusion. The film insert molding method is advantageous in that it is highly capable of realizing complicated shapes and it is adaptable to deep-drawn products. Fr example, this method is utilized for producing a transparent cover for an instrument panel of an automobile.

The film insert molding method, as described above, can be adapted for production of complicated molded products. For molded products having corners or curves, however, this method poses the problem that when an antireflection film of a conventional type is shaped into a predetermined shape while being heated, cracking is caused to its corner or curve where bending stress or tensile stress is concentrated, resulting in defective insert molding (Patent Documents 1 to 3).

PRIOR ART DOCUMENTS

Patent Documents

Patent Document 1: Japanese Patent No. 5745639
Patent Document 2: JP-A-2016-20049
Patent Document 3: JP-A-2014-208743

SUMMARY OF THE INVENTION

Problems to be Solved by the Invention

The present inventors diligently conducted studies on the cause of the above cracking or crazing, finding the following points to present the causes:
1) Cracking or crazing occurs mainly in a hard coat layer, and further propagates to an antireflection coating layer.
2) The hard coat layer is rigid (low in elongation) relative to an underlying sheet constituting the antireflection film. When the antireflection film is shaped into a predetermined shape upon heating, therefore, the hard coat layer cannot follow the deformation of the underlying sheet, leading to cracking or crazing.
3) Separation occurs at the interface between oxide particles for refractive index adjustment, which are contained in the antireflection coating, and a base material for the antireflection coating.

In the light of the above causes, the inventors took the following measures:
1) In a resin base material constituting the hard coat layer, 50% by mass or more of a tri- or lower functional urethane acrylate monomer is made to exist.
2) In a low refractive index layer, oxide particles for refractive index adjustment, such as hollow silica particles, are not contained.
3) In a medium refractive index layer, a special binder is employed, and rendered existent in a large amount.

The inventors have found that by adopting these measures, an elongation rate of 120 to 160% can be given to the resulting antireflection film and, consequently, an excellent antireflection film for film insert molding, whose cracking or crazing is suppressed, is obtained. These findings have led them to accomplish the present invention.

Means for Solving the Problems

That is, according to the present invention, there is provided a transparent resin substrate composed of a light-transmitting resin base sheet, an underlying layer formed on the base sheet, a hard coat layer formed on the underlying layer, and an antireflection coating formed on the hard coat layer, wherein the antireflection coating comprises a medium refractive index layer, and a low refractive index layer formed on the field-of-view side of the medium refractive index layer, the underlying layer is composed of a cured product obtained by curing (A1) a hexa- or higher functional urethane acrylate monomer, the hard coat layer is composed of a cured product formed by curing a hard coat layer composition which contains (A) a polymerizable monomer containing 50% by mass or more of (A2) a tri- or lower functional urethane acrylate monomer, (B) silica particles, (C) a silane coupling agent, and (D) a metal chelate compound, the medium refractive index layer is composed of a cured product formed by curing a medium refractive index layer composition which contains (E) an organic-inorganic composite compound, (F) metal oxide particles, (C) a silane coupling agent, and (D) a metal chelate compound, and the low refractive index layer is composed of a particle-free cured product formed by curing a low refractive index layer composition which contains (G) a silicon compound represented by the following general formula

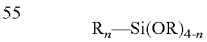

where
R is an alkyl group or an alkenyl group, and
n is a number 1 or 2,
(C) a silane coupling agent, and (D) a metal chelate compound.

In the invention of the above transparent resin substrate, it is preferred that
1) the antireflection coating has a high refractive index layer between the medium refractive index layer and the low refractive index layer, and the high refractive index layer is composed of a cured product formed by curing a high refractive index layer composition which contains (F) metal oxide particles, (C) a silane coupling agent, and (D) a metal chelate compound;

2) the hard coat layer composition contains 10 to 70 parts by mass of the silica particles (B), 1 to 10 parts by mass of the silane coupling agent (C), and 0.1 to 1.5 parts by mass of the metal chelate compound (D), based on 100 parts by mass of the polymerizable monomer (A), the medium refractive index layer composition contains 1 to 200 parts by mass of the metal oxide particles (F), 10 to 400 parts by mass of the silane coupling agent (C), and 0.1 to 15 parts by mass of the metal chelate compound (D), based on 100 parts by mass of the organic-inorganic composite compound (E), and the low refractive index layer composition contains 10 to 400 parts by mass of the silane coupling agent (C), and 1 to 20 parts by mass of the metal chelate compound (D), based on 100 parts by mass of the silicon compound (G);

3) the thickness of the light-transmitting resin base sheet is 30 to 1000 μm, the thickness of the underlying layer is 0.05 to 0.15 μm, the thickness of the hard coat layer is 1 to 5 μm, the thickness of the medium refractive index layer is 0.05 to 0.15 μm, and the thickness of the low refractive index layer is 0.05 to 0.15 μm;

4) the refractive index of the medium refractive index layer is 1.51 to 1.75, and the refractive index of the low refractive index layer is 1.40 to 1.50;

5) the light-transmitting resin base sheet is a base sheet selected from a polycarbonate resin sheet, an acrylate resin sheet, and a sheet being a laminate of a polycarbonate resin and an acrylate resin; and 6) the elongation rate of the transparent resin substrate is 120 to 160%.

Moreover, an antireflection film for insert molding, which is composed of the transparent resin substrate, is provided, and the transparent resin substrate is preferably used for film insert molding.

Effects of the Invention

The transparent resin substrate of the present invention has the underlying layer, the hard coat layer, and the antireflection coating, each of a specific composition, provided in this sequence on the resin base sheet having light-transmitting properties. The low refractive index layer in the antireflection coating, in particular, is a layer hitherto unseen which is free from silica particles. A special binder is adopted in the medium refractive index layer.

Because of these features, the elongation rate of the transparent resin substrate is high and, for example, an elongation rate of 120 to 160% can be realized. At the time of shaping in film insert molding, therefore, the layers on the base sheet easily follow the deformation of the base sheet. As a result, it has become possible to effectively prevent cracking or crazing of the hard coat layer or the antireflection coating, and further, peeling of each layer at the interface.

Consequently, when film insert molding is performed using the resin substrate as a film for insert molding, a transparent molded product having antireflection capability can be produced with a high production efficiency, with a decrease in yield due to defective molding being avoided.

The transparent resin substrate is very useful for industrial manufacturing, by film insert molding, of transparent molded products with an antireflective function, such as transparent front panels of various displays, and transparent covers for instrument panels in automobiles.

Mode for Carrying Out the Invention

The transparent resin substrate of the present invention has a fundamental structure in which a light-transmitting resin base sheet is used as a base material and, on its surface, an underlying layer, a hard coat layer, and an antireflection coating are laminated sequentially. The antireflection coating has a medium refractive index layer provided on the side of the hard coat layer, and a low refractive index layer provided on the field-of-view side. An embodiment in which a high refractive index layer is further provided between the medium refractive index layer and the low refractive index layer is preferred from the viewpoint of an improvement in the antireflective capability.

[Light-Transmitting Resin Base Sheet]

The light-transmitting resin base sheet (base sheet) has light-transmitting properties and, for example, is composed of a thermoplastic resin having a total light transmittance of 85% or more at a wavelength of 750 to 400 nm.

Preferred examples of such a thermoplastic resin having light-transmitting properties are acrylate resins typified by polymethyl methacrylate, polycarbonate resins, polyethylene terephthalate resins, polyallydiglycol carbonate resins, and polystyrene resins. It is preferred that the surface on the side where the hard coat layer is formed be formed from the acrylate resin, polycarbonate resin, or polyethylene terephthalate resin. Thus, a laminate of the polycarbonate resin and the acrylate resin can also be used preferably as the base sheet. Furthermore, such a base sheet may be one colored with an oil-soluble dye or the like, unless its light-transmitting properties are impaired.

The surface of the above base sheet may be surface-treated with a primer publicly known per se so as to be improved in adhesion to the hard coat layer.

The base sheet differs according to the shape or size of a molded product to be finally formed by film insert molding. Generally, it is preferably thin-walled moderately and, for example, a thickness of the order of 30 to 1000 μm is preferred. If the thickness is too large, the amount of the resin poured into the mold during film insert molding is restricted, and it may be difficult to obtain a molded product of the desired shape. If the thickness is too small, the shapability or the like of the transparent resin substrate is impaired, with the result that during film insert molding, a molding defect such as a bend is apt to occur when the transparent resin substrate is shaped with heating.

[Underlying Layer]

The underlying layer is a layer indispensable for making sure that the transparent resin substrate secures a predetermined elongation rate, and for preventing a situation in which when the surface of an antireflective transparent molded product as a final molded product is treated with a chemical, the chemical penetrating from the surface arrives at the base sheet, leading to blushing or generating irregularities.

In order to attain the above objects, the underlying layer needs to be composed of a cured product of a hexa- or higher functional urethane acrylate monomer (may hereinafter be referred to as 6-urethane acrylate; A1). The cured product of the 6-urethane acrylate (A1) has a high crosslinking density and a high hardness. A cured product of an ordinary acrylate monomer, even when having a hexa- or higher functionality, is too rigid to ensure a predetermined elongation rate. Even a urethane acrylate monomer, if it is a penta- or lower functional urethane acrylate monomer, is inferior in chemical resistance and is not sufficient in protecting the base sheet.

The 6-urethane acrylate (A1) is a polymerizable compound obtained by addition-reacting an isocyanate-terminated compound, which is obtained by reacting a polyol compound with a diisocyanate compound, with a (meth) acrylate compound having a plurality of hydroxyl groups. This polymerizable compound can be obtained by reacting these two starting materials by a method publicly known per se at such a quantity ratio that the molar amount of (meth) acryloyl groups becomes 6 times or more. For example, the 6-urethane acrylate (A1) having three (meth)acryloyl groups at each end of the molecular chain can be obtained by reacting an isocyanate having isocyanate groups at both ends (e.g., trihexadiethylene diisocyanate) with pentaerythritol tri(meth)acrylate.

Examples of the polyol compound are polyester polyol compounds, polyether polyol compounds, and polycarbonate diol compounds. Examples of the diisocyanate compound are aromatic diisocyanates such as tolylene diisocyanate and diphenylmethane diisocyanate, and aliphatic diisocyanates such as 1,6-hexamethylene diisocyanate and 1,3-bis(isocyanatomethyl)cyclohexane. The other starting material, (meth)acrylate compound, is exemplified by trimethylolpropane (meth)acrylate, pentaerythritol (meth)acrylate, and dipentaerythritol (meth)acrylate.

Concrete examples of the 6-urethane acrylate (A1) are dipentaerythritol hexa(meth)acrylate, phenyl glycidyl ether (meth)acrylate hexamethylene diisocyanate urethane prepolymer, phenyl glycidyl ether (meth)acrylate isophorone diisocyanate urethane prepolymer, phenyl glycidyl ether (meth)acrylate tolylene diisocyanate urethane prepolymer; glycerin di(meth)acrylate tolylene diisocyanate urethane oligomer, pentaerythritol tri(meth)acrylate hexamethylene diisocyanate urethane oligomer, glycerin di(meth)acrylate isophorone diisocyanate urethane oligomer, pentaerythritol tri (meth)acrylate tolylene diisocyanate urethane oligomer, and pentaerythritol tri(meth)acrylate isophorone diisocyanate urethane oligomer. These compounds may be used alone, or may be used in combination of two or more of them.

These 6-urethane acrylates (A1) are commercially available, for example, as Art Resin Series (Negami Chemical Industrial Co., Ltd.), U/UA Oligo Series (Shin-Nakamura Chemical Co., Ltd.), Ultraviolet UV Series (The Nippon Synthetic Chemical Industry Co., Ltd.), and Urethane Acrylate UA Series (KYOEISHA CHEMICAL CO., LTD.), and can be acquired generally.

The above 6-urethane acrylates (A1) may be used as a combination of two or more, from the viewpoints of viscosity adjustment for easy coating, and improvement of surface hardness after curing.

The thickness of the underlying layer is normally set at 0.05 to 0.15 µm. At a thickness of less than 0.05 µm, the function of this layer cannot be performed. A thickness in excess of 0.15 µm is undesirable, because the elongation rate of the resulting light-transmitting resin substrate decreases. The thickness is preferably 0.055 to 0.12 µm, and particularly preferably 0.065 to 0.1 µm.

The underlying layer is formed by coating the surface of the base sheet with an underlying layer composition containing the 6-urethane acrylate (A1), and then polymerizing the coated composition for curing.

In the underlying layer composition, an organic solvent is usually incorporated for enhancing coating properties, and a catalytic amount of a polymerization initiator is further incorporated for polymerization and curing.

As the organic solvent, there is used an alcohol-based solvent such as methanol or isopropanol; a ketone-based solvent such as methyl ethyl ketone or methyl isobutyl ketone; an ester-based solvent such as isobutyl acetate; or an aromatic solvent such as toluene. The alcohol-based solvent is preferred in that it is inexpensive and minimally damages the base sheet used.

The amount of the organic solvent used may be such an amount that the viscosity of the underlying layer composition is in a range where it is suitable for coating without causing dripping or the like. Generally, it is recommendable to use the organic solvent in such an amount that the concentration of the 6-urethane acrylate (A1) is 0.1 to 10% of the total mass.

The polymerization initiator includes a chemical curing type chemical polymerization initiator and a photocurable photopolymerization initiator. Depending on the curing method of the curing step, different types of initiators are used. Preferably, the photopolymerization initiator is adopted, because a curing operation involved is easy and a device used therein is simple.

As the chemical polymerization initiator, a peroxide such as benzoyl peroxide, di-t-butyl peroxide, or methyl ethyl ketone peroxide is employed preferably.

As the photopolymerization initiator, publicly known ones can be used singly or in combination. Examples thereof are diketones such as benzil and camphorquinone, and benzoin or benzoin alkyl ethers such as benzoin, benzoin methyl ether, benzoin ethyl ether, and benzoin isopropyl ether; aromatic ketones such as benzophenone and benzoylbenzoic acid; benzil ketals such as benzil dimethyl ketal and benzil diethyl ketal; acetophenones such as acetophenone, 2-hydroxy-2-methyl-1-phenyl-propan-1-one, and 1-(4-dodecylphenyl)-2-hydroxy-2-methylpropan-1-one; anthraquinones such as 2-methylanthraquionone, and 2-ethylanthraquinone; and thioxanthones such as 2,4-dimethylthioxanthone, 2-iropropylthioxanthone, and 2,4-diisopropylthioxanthone.

The polymerization initiator is incorporated usually in an amount of 1 to 10 parts by mass, preferably in an amount of 1 to 7 parts by mass, based on 100 parts by mass of the 6-urethane acrylate (A1), in order to proceed with polymerization effectively for curing. If the upper limit is exceeded, the underlying layer is apt to yellow.

The above polymerization initiator may be used in combination with various publicly known amine compounds which functions as a polymerization promotor.

The method of coating the underlying layer composition is not limited. Its examples are dip coating, spray coating, roll coating, and flow coating, of which a suitable method is selected and adopted according to the viscosity of the composition, the coating thickness, the coated area, etc. The coated composition is heat-dried, and then heated or photoirradiated for polymerization and curing, whereby the underlying layer is formed.

[Hard Coat Layer]

A hard coat layer is provided on the underlying layer. The hard coat layer is composed of a cured product formed by curing a hard coat layer composition which contains (A) a polymerizable monomer, (B) silica particles, (C) a silane coupling agent, and (D) a metal chelate compound. This is a layer provided for ensuring the hardness and mechanical strength of the transparent resin substrate.

However, in order to ensure the elongation rate of the transparent resin substrate, it is important that 50% by mass or more of a tri- or lower functional urethane acrylate monomer (may hereinafter be referred to as 3-urethane acrylate; A2) be contained as a polymerizable monomer in the whole monomer. If the content of the 3-urethane acrylate (A2) is less than 50% by mass, the elongation rate of the transparent resin substrate fails to fulfill a predetermined value. The use of such a resin substrate for film insert molding presents the cause of cracking or crazing. From the above aspect, if the 3-urethane acrylate (A2) is contained in an amount of 70 to 97% by mass in all monomers, this is preferred, because the elongation rate is 130% or more. Particularly preferred is the content of 80 to 95% by mass, because the elongation rate is 155% or more.

The 3-urethane acrylate (A2) in an amount of 100% by mass is preferred from the viewpoint of the elongation rate, but is not preferred, because chemical penetration into the substrate is liable to occur. Thus, its use in combination with a tetra- or higher functional urethane acrylate monomer (may hereinafter be referred to as 4-urethane acrylate; A3) is preferred. A particularly preferred example of the combined use is a combination of the 3-urethane acrylate (A2) and the 6-urethane acrylate (A1) from the viewpoint of preventing the penetration of a chemical.

The 3-urethane acrylate (A2), like the 6-urethane acrylate (A1), is obtained by addition-reacting an isocyanate-terminated compound, which is obtained by reacting a polyol compound with a diisocyanate compound, with a (meth) acrylate compound having a plurality of hydroxyl groups. For example, a urethane acrylate having one (meth)acryloyl group introduced into each of both ends, which is obtained by reacting an isocyanate-terminated compound with pentaerythritol mono(meth)acrylate, is used as a difunctional urethane acrylate. A urethane acrylate, which is obtained by reacting pentaerythritol mono(meth)acrylate and pentaerythritol di(meth)acrylate with an isocyanate-terminated compound, thereby introducing one (meth)acryloyl group into one end of the isocyanate compound and two (meth) acryloyl groups into the other end, is used as a trifunctional urethane acrylate.

As the starting polyol compound, diisocyanate compound, and (meth)acrylate compound, those shown in connection with the 6-urethane acrylate (A1) can be used unchanged. However, these compounds need to be used in such a quantity ratio that the molar amount of (meth) acryloyl groups will become 3 times or less.

These 3-urethane acrylates (A2) are marketed, for example, as Art Resin Series (Negami Chemical Industrial Co., Ltd.), U/UA Series (Shin-Nakamura Chemical Co., Ltd.), Ultraviolet UV Series (The Nippon Synthetic Chemical Industry Co., Ltd.), and Urethane Acrylate A Series (KYOEISHA CHEMICAL CO., LTD.), and are generally available.

The 4-urethane acrylate (A3) is synthesized in accordance with the procedures for the 6-urethane acrylate (A1) and the 3-urethane acrylate (A2) by the same reaction with the use of the same starting materials. For example, a urethane acrylate, which is obtained by reacting pentaerythritol di(meth)acrylate with an isocyanate-terminated compound, thereby introducing two (meth)acryloyl groups into both ends of the isocyanate compound, is used as a 4-urethane acrylate. The aforementioned 6-urethane acrylate (A1) is also a compound included in the 4-urethane acrylate (A3). These compounds are marketed by the above companies.

The silica particles (B) are particles consisting essentially of silicon dioxide, containing no cavities inside, and having a density of 1.9 or more. Their average particle size is 5 to 500 nm and their refractive index is in the range of 1.44 to 1.5. These particles act to coat a solution of the hard coat layer composition smoothly in addition to maintaining the hardness of the hard coat layer. The average particle size in the present invention refers to a particle size at a cumulative volume of 50% in a particle size distribution measured by laser diffraction scattering.

The silica particles (B) are used in an amount of 10 to 70 parts by mass based on 100 parts by mass of the polymerizable monomer (A). Since these particles are incorporated in such a range into the hard coat layer, the hard coat layer composition solution can be coated smoothly, with fundamental characteristics such as hardness being maintained for the entire hard coat layer. Thus, cracking or crazing during insert molding can be prevented effectively. Preferably, the content of the silica particles (B) is 20 to 60 parts by mass and, particularly preferably, the content is 30 to 50 parts by mass.

The silane coupling agent (C) allows the silica particles (B) to be dispersed and held stably in the base material of the cured product, namely, suppresses the aggregation of the particles, thereby making the effect of addition of the silica particles exhibited to the maximum. Furthermore, the silane coupling agent (C) acts to ensure the adhesion between the base sheet laid below and the medium refractive index layer laid above.

In particular, the silane coupling agent (C) is contained in the medium refractive index layer as the upper layer. Hence, high adhesion appears between the medium refractive index layer and the hard coat layer. Moreover, the silane coupling agent (C) undergoes polycondensation simultaneously with hydrolysis, forming a polymer linked in a network form by Si—O—Si bonds, thus being capable of densifying the hard coat layer.

As the silane coupling agent (C), publicly known silicon compounds, which have a reactive hydrolysable group and an organofunctional group chemically bonding to an organic material, and function to bind an organic material and an inorganic material, are adopted without limitation.

Concrete examples are γ-(meth)acryloxypropyltrimethoxysilane, γ-glycidoxypropyltrimethoxysilane, β-(3,4-epoxycyclohexyl)ethyltrimethoxysilane, γ-glycidoxypropylmethyldiethoxysilane, γ-aminopropyltriethoxysilane, γ-aminopropylmethyldimethoxysilane, N-(β-aminoethyl)-γ-aminopropyltrimethoxysilane, γ-anilinopropyltrimethoxysilane, γ-(N-styrylmethyl-β-aminoethylamino)propyltrimethoxysilane hydrochloride, and γ-mercaptopropyltrimethoxysilane.

The silane coupling agent (C) is different in structure and function from the silicon compound (G) represented by a general formula to be described later, and is a component different therefrom.

The silane coupling agent (C) is used in an amount of 1 to 10 parts by mass based on 100 parts by mass of the polymerizable monomer (A). If its content is less than 1 part by mass, its effect is not exhibited. If its content exceeds 10 parts by mass, the smoothness of the hard coat layer is impaired, and film formation becomes impossible. Its content is preferably 3 to 9 parts by mass, and particularly preferably 5 to 8 parts by mass.

The metal chelate compound acts to introduce a crosslinked structure into the hard coat layer, thereby achieving further densification. As stated earlier, the hard coat layer of the present invention uses a larger amount of the 3-urethane acrylate (A2) than in the conventional practice, and thus is higher in flexibility, but lower in denseness. The metal chelate compound (D) is used to compensate for such a decline in denseness without impairing flexibility. Since the metal chelate compound (D) is contained also in the medium refractive index layer and the low refractive index layer, moreover, the adhesion between the hard coat layer and the antireflection coating is enhanced, so that crazing or the like during insert molding can be prevented effectively.

The metal chelate compound (D) is a compound in which a chelating agent typified by a bidentate ligand is coordinated to a metal such as titanium, zirconium or aluminum. Such publicly known compounds can be used without limitation.

Concrete examples are titanium chelate compounds such as triethoxy-mono(acetylacetonato)titanium, diethoxy-bis(acetylacetonato)titanium, monoethoxy-tris(acetylacetonato)titanium, tetrakis(acetylacetonato)titanium, triethoxy-mono(ethylacetoacetato)titanium, diethoxy-bis(ethylacetoacetato)titanium, monoethoxy-tris(ethylacetoacetato)titanium, mono(acetylacetonato)tris(ethylacetoacetato)titanium, bis(acetylacetonato)bis(ethylacetoacetato)titanium, and tris(acetylacetonato)mono(ethylacetoacetato)titanium; zirconium chelate compounds such as triethoxy-mono(acetylacetonato)zirconium, diethoxy-bis(acetylacetonato)zirconium, monoethoxy-tris(acetylacetonato)zirconium, tetrakis(acetylacetonato)zirconium, triethoxy-mono(ethylacetoacetato)zirconium, diethoxy-bis(ethylacetoacetato)zirconium, monoethoxy-tris(ethylacetoacetato)zirconium, tetrakis(ethylacetoacetato)zirconium, mono(acetylacetonato)tris(ethylacetoacetato)zirconium, bis(acetylacetonato)bis(ethylacetoacetato)zirconium, and tris(acetylacetonato)mono(ethylacetoacetato)zirconium; and aluminum chelate compounds such as diethoxy-mono(acetylacetonato)aluminum, monoethoxy-bis(acetylacetonato)aluminum, di-i-propoxy-mono(acetylacetonato)aluminum, monoethoxy-bis(ethylacetoacetato)aluminum, and diethoxy-mono(ethylacetoacetato)aluminum.

The metal chelate compound (D) is used in an amount of 0.1 to 1.5 parts by mass based on 100 parts by mass of the polymerizable monomer. By using this compound in this range, the hard coat layer becomes densified, and mechanical characteristics such as hardness are improved. Preferably, the content of the metal chelate compound (D) is 0.2 to 0.9 parts by mass and, particularly preferably, the content is 0.3 to 0.8 parts by mass.

The thickness of the hard coat layer is preferably 1 to 5 μm. At a thickness of less than 1 μm, the characteristics, such as strength, of the hard coat layer are impaired. At a thickness exceeding 5 μm, a predetermined elongation rate fails to be achieved, and cracking or crazing occurs during film insert molding, presenting the cause of a molding failure. The thickness is preferably 1 to 4 μm, and particularly preferably 1.2 to 3 μm.

The hard coat layer is formed by coating the surface of the underlying layer with the hard coat layer composition which contains the polymerizable monomer (A), the silica particles (B), the silane coupling agent (C), and the metal chelate compound (D), and then polymerizing and condensation-curing the coated composition.

In the composition, an organic solvent is incorporated for enhancing the coating properties, and a catalytic amount of a polymerization initiator is incorporated for polymerization and curing, as in the underlying layer composition. The organic solvent is usually used so that the total concentration of the (A), (B), (C) and (D) components will be 15 to 40% by mass, from the viewpoint of the coating properties. Moreover, a catalytic amount of a hydrolysis catalyst is incorporated for proceeding with the condensation curing. An aqueous solution of an acid, such as hydrochloric acid, sulfuric acid, nitric acid, or acetic acid, is used as the hydrolysis catalyst.

The coating method and the curing step for the hard coat layer composition are performed in compliance with those for the underlying layer mentioned earlier.

[Medium Refractive Index Layer]

A medium refractive index layer is provided on the hard coat layer. The medium refractive index layer is composed of a cured product formed by curing a medium refractive index layer composition containing (E) an organic-inorganic composite compound, (F) metal oxide particles, (C) a silane coupling agent, and (D) a metal chelate compound. This layer usually has a refractive index set at 1.51 to 1.75.

The medium refractive index layer of the present invention is characterized by containing the organic-inorganic composite compound (E).

The organic-inorganic composite compound is, for example, a composite compound having an alkoxysilyl group bound to a bisphenol A type epoxy compound. In this compound, crosslinking of epoxy groups between compounds occurs, and formation of silica particles by sol-gel curing of alkoxysilyl groups occurs. The resulting product is a cured product having the advantages of both an organic material and an inorganic material and having no glass transition point (Tg).

The organic-inorganic composite compound is a composite compound having a structure in which an alkoxysilyl group is bound to a compound of a varying type, for example, a bisphenol A epoxy compound, a novolak phenol compound, or a polyamic acid compound. In the present invention, the cured product of such an organic-inorganic composite compound is present as a base material in the medium refractive index layer. Thus, this layer shows the feature of becoming flexible and exhibiting high elongation rate characteristics without having its strength impaired.

As the organic-inorganic composite compound, a composite compound formed by bonding an alkoxysilyl group to a bisphenol A type epoxy compound is preferred from the viewpoints of maximally exhibiting high elongation rate characteristics without impairing the hardness of the medium refractive index layer and being easily available.

In the medium refractive index layer, the metal oxide particles (F) are incorporated for adjusting the refractive index to a predetermined value. Examples of the particles are zirconia particles (refractive index 2.40), titania particles (refractive index 2.70), alumina particles (refractive index 1.78), and antimony oxide particles (refractive index 2.04). These particles are used singly or in combination to adjust the refractive index. In consideration of dispersibility in an organic solvent, stability of a composition solution, and adhesion, zirconia particles are preferred. The average particle size of these particles, if excessively large, causes scattering of light and lowers the optical characteristics of the layer. Thus, the average particle size is preferably a size not greatly exceeding the thickness of the medium refractive index layer, and is particularly preferably 100 nm or less.

The metal oxide particles (F) are incorporated in an amount of usually 1 to 200 parts by mass, preferably 5 to 100 parts by mass, particularly preferably 10 to 50 parts by mass, based on 100 parts by mass of the organic-inorganic composite compound (E). If the amount incorporated is small, a predetermined refractive index cannot be maintained. If it is large, the medium refractive index layer becomes rigid, and the elongation rate declines. Not only the characteristic features of the present invention are impaired, but the layer itself becomes brittle.

The silane coupling agent (C) is a component which acts to disperse and hold the metal oxide particles (F) stably in the base material of the cured product, and adjust the refractive index of the layer. As the silane coupling agent (C), the compounds used in the hard coat layer can be used without limitation.

The silane coupling agent (C) is used in an amount of usually 10 to 400 parts by mass, preferably 50 to 250 parts by mass, particularly preferably 75 to 150 parts by mass, based on 100 parts by mass of the organic-inorganic composite compound (E). If the amount incorporated is small, dispersibility of the metal oxide particles (F) in the base material lowers. If it is large, the medium refractive index layer becomes rigid, and the elongation rate declines, thus impairing the characteristic features of the present invention.

As the metal chelate compound (D), the compounds used in the hard coat layer are used for the same purpose without limitation.

The metal chelate compound (D) is used in an amount of 0.1 to 15 parts by mass based on 100 parts by mass of the organic-inorganic composite compound (E). By using this compound in this range, the hard coat layer becomes densified, and the mechanical characteristics such as hardness are improved. Preferably, the content of the metal chelate compound (D) is 0.5 to 10 parts by mass and, particularly preferably, the content is 1 to 5 parts by mass.

The thickness of the medium refractive index layer is usually 0.05 to 0.15 μm, preferably 0.055 to 0.12 μm, particularly preferably 0.065 to 0.1 μm. If the thickness is less than 0.05 μm, the medium refractive index layer cannot show its inherent functions. If the thickness exceeds 0.15 μm, this layer does not function as an interference film any more, and loses antireflective capability.

The medium refractive index layer is formed by coating the surface of the hard coat layer with a medium refractive index layer composition which contains the organic-inorganic composite compound (E), metal oxide particles (F), silane coupling agent (C), and metal chelate compound (D) described above, and then condensation-curing the coated composition.

In the composition, an organic solvent is incorporated for enhancing the coating properties, and a catalytic amount of a hydrolysis catalyst is incorporated for proceeding with the condensation curing, as in the underlying layer composition. The metal oxide particles to be contained in the medium refractive index layer are usually dispersed in an alcohol-based solvent, and the dispersion is commercially available. Thus, the use of an alcohol-based solvent is preferred as the organic solvent. The amount of the organic solvent used complies with that for the hard coat layer composition.

The coating method and the curing step for the medium refractive index layer composition are performed in compliance with those for the underlying layer mentioned earlier.

[Low Refractive Index Layer]

A low refractive index layer having a lower refractive index than the refractive index of the medium refractive index layer is provided on the field-of-view side of the medium refractive index layer. If the antireflection coating is composed of two layers, the low refractive index layer is directly formed on the medium refractive index layer. If the antireflection coating is composed of three layers, a high refractive index layer is formed between the low refractive index layer and the medium refractive index layer. The low refractive index layer is composed of a particle-free cured product formed by curing a low refractive index layer composition which contains (G) a silicon compound represented by the following general formula:

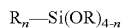

where
R is an alkyl group or an alkenyl group, and
n is a number 1 or 2,
(C) a silane coupling agent, and (D) a metal chelate compound, and is a layer having a refractive index usually set at 1.40 to 1.50.

The present invention is characterized in that silica particles used so far, such as hollow silica, are not used in the low refractive index layer. Consequently, even when stress is concentrated in a part of the transparent resin substrate, separation at the interface between silica particles and the base material does not occur, and cracking or crazing at least in the low refractive index layer can be prevented.

Examples of the silicon compound (G) are trialkoxysilanes such as methyltriethoxysilane, ethyltrimethoxysilane, and vinyltrimethoxysilane, as the silicon compound with n=1; and dialkoxysilanes such as dimethyldimethoxysilane, and dimethyldiethoxysilane, as the silicon compound with n=2.

In the present invention, of the compounds exemplified above, methyltriethoxysilane and ethyltrimethoxysilane, in particular, are preferred in terms of a low refractive index.

The silane coupling agent (C) acts to improve adhesion to the lower layer, the medium refractive index layer, but is also a component for adjusting the refractive index of the layer, as does the silicon compound (G). As the silane coupling agent (C), the compounds used in the hard coat layer can be used without limitation.

The silane coupling agent (C) is used in an amount of 10 to 400 parts by mass, preferably 20 to 200 parts by mass, particularly preferably 25 to 70 parts by mass, based on 100 parts by mass of the silicon compound (G). If the amount incorporated is small, the coating strength deteriorates. If it is large, a low refractive index layer is not obtained, and antireflective capability does not appear.

As the metal chelate compound (D), the compounds used in the hard coat layer are used for the same purpose without limitation.

The metal chelate compound (D) is used in an amount of 1 to 20 parts by mass based on 100 parts by mass of the silane coupling agent. By using this compound in this range, the low refractive index layer becomes densified, and the mechanical characteristics such as hardness are improved. Preferably, the content of the metal chelate compound (D) is 1.5 to 15 parts by mass and, particularly preferably, the content is 2 to 7 parts by mass.

The thickness of the low refractive index layer is usually 0.05 to 0.15 μm, preferably 0.055 to 0.12 μm, particularly preferably 0.065 to 0.1 μm. If the thickness is less than 0.05 μm, the low refractive index layer cannot show its inherent functions. If the thickness exceeds 0.15 μm, this layer does not function as an interference film any more, and loses antireflective performance.

The low refractive index layer is formed by coating the surface of the medium refractive index layer with a low refractive index layer composition which contains the silicon compound (G), silane coupling agent (C), and metal chelate compound (D) described above, and then condensation-curing the coated composition.

In the composition, an organic solvent is incorporated for enhancing the coating properties, and a catalytic amount of a hydrolysis catalyst is incorporated for proceeding with the condensation curing, as in the underlying layer composition. The amount of the organic solvent used complies with that for the hard coat layer composition.

[High Refractive Index Layer]

In the transparent resin substrate of the present invention, an embodiment in which a three-layer antireflection coating having a high refractive index layer provided between the medium refractive index layer and the low refractive index layer is formed is also adopted for enhancing the antireflective capability.

The high refractive index layer is a layer having a refractive index set to be higher than that of the medium refractive index layer, and usually having a refractive index of 1.70 or higher. The high refractive index layer is formed by curing the aforementioned metal oxide particles (F), silane coupling agent (C), and metal chelate compound (D) in the same manner. Its thickness also complies with the thicknesses of the medium and low refractive index layers.

[Film Insert Molding]

The so formed transparent resin substrate, for example, is disposed within a predetermined mold, and shaped in conformity with the surface of the mold while being heated. Then, a predetermined resin is poured into the mold, and cured. In this manner, a molded product of a predetermined shape provided with an antireflection coating on the surface can be obtained. As the resin poured in, a transparent thermoplastic resin having satisfactory thermal fusibility to the base sheet, for example, a polycarbonate resin or an acrylic resin, is employed preferably.

Furthermore, this transparent resin substrate can also be used for thermal shaping and thermoforming, such as embossing or bending with a hot press, in addition to film insert molding.

With the transparent resin substrate of the present invention, cracking or crazing of the hard coat layer or the antireflection coating can be effectively prevented during film insert molding, and a decrease in the yield due to a molding defect is avoided, so that high productivity can be ensured.

The transparent resin substrate for film insert molding can be applied, for example, to molding of a front panel of a light display surface such as CRT, LCD or a plasma display, and a front clear cover of an instrument panel of an automobile.

EXAMPLES

The present invention will now be described concretely by reference to Examples, but is in no way limited thereby. Not all of combinations of the characteristic features explained in the Examples are essential to the means for solving the problems that the present invention tackles.

Various components and abbreviations used in the following Examples and Comparative Examples, and testing methods therein will be described below.

(A) Polymerizable Monomer
  (A1) Hexa- or higher functional urethane acrylate monomer:
    A1-6: Urethane acrylate prepolymer having six terminal acrylate groups
  (A2) Tri- or lower functional urethane acrylate monomer:
    A2-3: Urethane acrylate monomer having three terminal acrylate groups
  (A3) Tetra- or higher functional urethane acrylate monomer:
    A1-6: Same as the above monomer.
(B) Silica Particles
  Spherical silica: Average particle size=10 nm, refractive index=1.46
  IPA dispersion medium (solid content: 20% by mass)
(C) Silane Coupling Agent
  γ-GPS: γ-glycidoxypropyltrimethoxysilane
  3-GPDS: 3-glycidoxypropylmethyldimethoxysilane
(D) Metal Chelate Compound
  AlTA: Aluminum trisacetylacetonate
(E) Organic-Inorganic Composite Compound
  ASE: Trialkoxymethylsilyl group-modified bisphenol A type epoxy compound (alkoxy group-containing silane-modified epoxy compound)
(F) Metal Oxide Particles
  $ZrO_2$: Average particle size=50 nm, refractive index=2.40
  PGM dispersion medium (solid content: 55% by mass)
(G) Silicon Compound
  MTES: Methyltriethoxysilane
(H) Others
  Transparent resin base sheet
  PC: Polycarbonate resin (thickness 300 μm, Tg=140° C.)
    Total light transmittance=90%
  Organic solvents
  IPA: Isopropyl alcohol
  MIBK: Methyl isobutyl ketone
  SBAC: Acetic acid sec-butyl ester
  PGM: 1-methoxy-2-propanol
  Hydrolysis catalyst
  HCl: 0.05 N aqueous solution of hydrochloric acid
  Polymerization initiator
  APPI: Alkylphenone-based photopolymerization initiator
  Ultraviolet absorber
  UV1: Benzotriazole type ultraviolet absorber (1) Elongation Rate The substrate was heated for about 30 seconds at the softening temperature (140° C.) of the base sheet, and bent using a 90° bending jig with varying R. Based on the R value of the bending tool at which no cracking occurred, the elongated length (circumference) of the exterior of the substrate was calculated (¼×πR because of 90°). It was assumed that the interior of the substrate was only bent, and was not elongated. On this assumption, the thickness of the substrate was subtracted from the elongated length of the exterior, and the value calculated by this subtraction was taken as the circumference of the interior {¼×π(R−thickness of transparent resin substrate)}. The ratio of the circumference of the elongated exterior to the circumference of the interior as 100 was calculated, and the so obtained value was used as the elongation rate.

(2) Total Light Transmittance

A maximum transmittance value at a wavelength of 780 to 380 nm was measured at a scanning speed of 1000 nm/min using JASCO Corporation's V-550 coupled with an integrating sphere. This value was taken as total light transmittance.

(3) Reflectance

Reflectance at the lowest point (surface of transparent resin laminate) was measured using the same tester as for the total light transmittance under the same conditions as for the total light transmittance. The lower its value is, the better antireflective capability is shown.

(4) Hardness

Hardness was measured on a pencil (Uni, produced by Mitsubishi Pencil Co., Ltd.) by means of YOSHIMITSU SEIKI's hardness meter C-2210. The hardness is expressed as pencil hardness. The higher this hardness, the more satisfactory abrasion resistance is.

(5) Abrasion Resistance

A standard adjacent cotton fabric for testing (Calico No. 3, produced by Japanese Standards Association) was reciprocated on the surface of a specimen 3,000 times at a pressure of 500 g/cm². Whether or not scuffs were caused by the reciprocations was visually determined to evaluate abrasion resistance. The evaluation criteria are offered below. In the present test, transmitted light refers to light transmitted through the transparent resin substrate, while reflected light refers to light reflected by the surface of the transparent resin substrate.

◎: No scuffs were seen upon observation of both transmitted light and reflected light.
○: Several scuffs were seen upon observation of transmitted light, but no scuffs were seen in the case of reflected light.
Δ: Several scuffs were seen upon observation of both transmitted light and reflected light.
X: Ten or more scuffs were seen upon observation of both transmitted light and reflected light.

(6) Thermal Shapability

Whether or not cracking occurred during thermal shaping upon heating for 60 seconds at 115° C. before molding was observed.
○: Thermal shaping was possible without cracking.
X: Cracking occurred.

Example 1

PC (thickness 300 μm) was used as a transparent resin base sheet, and the surface of the sheet was coated with an underlying layer composition of a formulation indicated below by dip coating. Then, the coated composition was irradiated with ultraviolet rays for 1 minute from a high pressure mercury lamp heated at 60° C. for 5 minutes. As a result, a 0.1 μm underlying layer was formed on the surface of the base sheet.

Underlying layer composition: The composition ratio based on 100 parts by mass of the polymerizable monomer (A) was shown in parentheses.

| (A1): A1-6 | 20.00 g (100) |
|---|---|
| Photopolymerization initiator: APPI | 0.5 g (2) |
| Organic solvent: | IPA 784 g/ SBAC 196 g |

Then, the surface of the underlying layer was coated with a hard coat layer composition of a formulation indicated below by dip coating. Then, the coated composition was irradiated with ultraviolet rays for 1 minute from a high pressure mercury lamp heated at 60° C. for 5 minutes. As a result, a 1.5 μm hard coat layer was formed on the surface of the underlying layer.

Hard coat layer composition: The composition ratio based on 100 parts by mass of the polymerizable monomer (A1+ A2) was shown in parentheses.

| (A1): A1-6 | 29.0 g (20) |
|---|---|
| (A2): A2-3 | 118.0 g (80) |
| (B): Spherical silica | 63.0 g (43) |
| (C): γ-GPS | 10.5 g (7) |
| (D): AlTA | 1.0 g (0.7) |
| Photopolymerization initiator: APPI | 11.0 g (7) |
| Hydrolysis catalyst: HCl | 2.0 g |

| Ultraviolet absorber: UV1 | 10.0 g (7) |
|---|---|
| Organic solvent: | IPA 453 g/MIBK 302 g |

Then, the surface of the hard coat layer was coated with a medium refractive index layer composition of a formulation indicated below by dip coating. Then, the coated composition was heated at 80° C. for 20 minutes. As a result, a medium refractive index layer having a refractive index of 1.58 and a thickness of 0.1 μm was formed on the surface of the hard coat layer.

Medium refractive index layer composition: The composition ratio based on 100 parts by mass of the organic-inorganic composite compound (ASE) was shown in parentheses.

| (E): ASE | 19.0 g (100) |
|---|---|
| (F): $ZrO_2$ | 10.0 g (50) |
| (C): γ-GPS | 19.0 g (100) |
| (D): AlTA | 0.6 g (3) |
| Hydrolysis catalyst: HCl | 7.0 g |
| Organic solvent: | PGM 8.0 g/IPA 281 g/ SBAC 655 g |

Then, the surface of the medium refractive index layer was coated with a low refractive index layer composition of a formulation indicated below by dip coating. Then, the coated composition was heated at 80° C. for 20 minutes. As a result, a low refractive index layer having a refractive index of 1.47 and a thickness of 0.1 μm was formed on the surface of the medium refractive index layer.

Low refractive index layer composition: The composition ratio based on 100 parts by mass of the silicon compound (MTES) was shown in parentheses.

| (G): MTES | 13.0 g (100) |
|---|---|
| (C): γ-GPS | 9.0 g (67) |
| (D): AlTA | 0.9 g (7) |
| Hydrolysis catalyst: HCl | 4.0 g |
| Organic solvent: IPA | 973 g |

In connection with the resulting transparent resin substrate, the elongation rate, total light transmittance, refractive index, hardness, abrasion resistance, and thermal shapability were evaluated in accordance with the above-described testing methods The results are shown in Table 8. The components of the compositions used in the formation of the respective layers, their amounts incorporated, the film thicknesses, and the refractive indexes of the layers are summarized in Table 1.

Examples 2 to 17

The transparent resin substrates were prepared in the same manner as in Example 1, except that the formulations of the underlying layer composition, the hard coat layer composition, the medium refractive index layer composition, and the low refractive index layer composition were changed to compositions as shown in Tables 1 to 6. The results are shown in Table 8.

TABLE 1

|  |  | Example 1 | | Example 2 | | Example 3 | |
|---|---|---|---|---|---|---|---|
| Base sheet |  | PC | | PC | | PC | |
| Low refractive index layer (n1) |  | *1 | *2 | *1 | *2 | *1 | *2 |
| Silicon compound | MTES | 13.0 | 100 | 18.0 | 100 | 20.0 | 100 |

TABLE 1-continued

|  |  | Example 1 | | Example 2 | | Example 3 | |
|---|---|---|---|---|---|---|---|
| Silane coupling agent | γ-GPS | 9.0 | 67 | 4.0 | 25 | 2.0 | 11 |
| Metal chelate compound | AlTA | 0.9 | 7 | 0.4 | 2 | 0.2 | 1 |
| Hydrolysis catalyst | HCl | 4.0 | | 6.0 | | 6.0 | |
| Organic solvent | IPA | 973 | | 971 | | 972 | |
| Total | | 1000 | 174 | 1000 | 127 | 1000 | 112 |
| Refractive index | | 1.47 | | 1.45 | | 1.44 | |
| Film thickness [μm] | | 0.1 | | 0.1 | | 0.1 | |
| Medium refractive index layer (n3) | | *1 | *2 | *1 | *2 | *1 | *2 |
| Metal oxide particles | $ZrO_2$ | 10.0 | 50 | 2.0 | 11 | 0.5 | 2 |
| Silane coupling agent | γ-GPS | 19.0 | 100 | 23.0 | 100 | 24.0 | 100 |
| Organic-inorganic composite compound | ASE | 19.0 | 100 | 23.0 | 100 | 24.0 | 100 |
| Metal chelate compound | AlTA | 0.6 | 3 | 0.8 | 3 | 0.8 | 4 |
| Hydrolysis catalyst | HCl | 7.0 | | 8.0 | | 8.0 | |
| Organic solvent | PGM | 8.0 | | 2.0 | | 0.4 | |
| Organic solvent | IPA | 281 | | 283 | | 283 | |
| Organic solvent | SBAC | 655 | | 658 | | 659 | |
| Total | | 1000 | 253 | 1000 | 214 | 1000 | 206 |
| Refractive index | | 1.58 | | 1.52 | | 1.51 | |
| Film thickness [μm] | | 0.1 | | 0.1 | | 0.1 | |
| Hard coat layer | | *1 | *2 | *1 | *2 | *1 | *2 |
| Polymerizable monomer | A1-6 | 29.0 | 20 | 15.0 | 10 | 7.0 | 5 |
| Polymerizable monomer | A2-3 | 118.0 | 80 | 132.0 | 90 | 140.0 | 95 |
| Total | | | 100 | | 100 | | 100 |
| Silica particles | spherical silica | 63.0 | 43 | 63.0 | 43 | 63.0 | 43 |
| Silane coupling agent | γ-GPS | 11.0 | 7 | 11.0 | 7 | 11.0 | 7 |
| Metal chelate compound | AlTA | 1.0 | 0.7 | 1.0 | 0.7 | 1.0 | 0.7 |
| Polymerization initiator | APPI | 11.0 | 7 | 11.0 | 7 | 11.0 | 7 |
| Ultraviolet absorber | UV1 | 10.0 | 7 | 10.0 | 7 | 10.0 | 7 |
| Hydrolysis catalyst | HCl | 2.0 | | 2.0 | | 2.0 | |
| Organic solvent | IPA | 453 | | 453 | | 453 | |
| Organic solvent | MIBK | 302 | | 302 | | 302 | |
| Total | | 1000 | 165 | 1000 | 165 | 1000 | 165 |
| Film thickness [μm] | | 1.5 | | 1.5 | | 1.5 | |
| Underlying layer | | *1 | *2 | *1 | *2 | *1 | *2 |
| Polymerizable monomer | A1-6 | 20.0 | 100 | 20.0 | 100 | 20.0 | 100 |
| Polymerization initiator | APPI | 0.5 | 2 | 0.5 | 2 | 0.5 | 2 |
| Organic solvent | IPA | 784 | | 784 | | 784 | |
| Organic solvent | SBAC | 196 | | 196 | | 196 | |
| Total | | 1000 | 102 | 1000 | 102 | 1000 | 102 |
| Film thickness [μm] | | 0.1 | | 0.1 | | 0.1 | |

*1: Amount incorporated [g],
*2: Solid content ratio [parts by mass]

TABLE 2

|  |  | Example 4 | | Example 5 | | Example 6 | |
|---|---|---|---|---|---|---|---|
| Base sheet | | PC | | PC | | PC | |
| Low refractive index layer (n1) | | *1 | *2 | *1 | *2 | *1 | *2 |
| Silicon compound | MTES | 4.0 | 100 | 18.0 | 100 | 18.0 | 100 |
| Silane coupling agent | γ-GPS | 18.0 | 400 | 4.0 | 25 | 4.0 | 25 |
| Metal chelate compound | AlTA | 0.7 | 16 | 0.4 | 2 | 0.4 | 2 |
| Hydrolysis catalyst | HCl | 6.0 | | 6.0 | | 6.0 | |
| Organic solvent | IPA | 971 | | 971 | | 971 | |
| Total | | 1000 | 516 | 1000 | 127 | 1000 | 127 |
| Refractive index | | 1.50 | | 1.45 | | 1.45 | |
| Film thickness [μm] | | 0.1 | | 0.1 | | 0.1 | |
| Medium refractive index layer (n3) | | *1 | *2 | *1 | *2 | *1 | *2 |
| Metal oxide particles | $ZrO_2$ | 14.0 | 86 | 0.5 | 5 | 0.5 | 1 |
| Silane coupling agent | γ-GPS | 17.0 | 100 | 38.0 | 395 | 5.0 | 11 |
| Organic-inorganic composite compound | ASE | 17.0 | 100 | 10.0 | 100 | 43.0 | 100 |
| Metal chelate compound | AlTA | 0.6 | 4 | 1.0 | 13 | 0.2 | 0.4 |
| Hydrolysis catalyst | HCl | 5.0 | | 12.0 | | 2.0 | |
| Organic solvent | PGM | 12.0 | | 0.4 | | 0.4 | |
| Organic solvent | IPA | 280 | | 282 | | 285 | |
| Organic solvent | SBAC | 654 | | 656 | | 664 | |
| Total | | 1000 | 290 | 1000 | 513 | 1000 | 113 |

TABLE 2-continued

|  |  | Example 4 | | Example 5 | | Example 6 | |
| --- | --- | --- | --- | --- | --- | --- | --- |
| Refractive index | | 1.61 | | 1.51 | | 1.51 | |
| Film thickness [μm] | | 0.1 | | 0.1 | | 0.1 | |
| Hard coat layer | | *1 | *2 | *1 | *2 | *1 | *2 |
| Polymerizable monomer | A1-6 | 44.0 | 30 | 30.0 | 20 | 15.0 | 10 |
| Polymerizable monomer | A2-3 | 103.0 | 70 | 118.0 | 80 | 132.0 | 90 |
| Total | | | 100 | | 100 | | 100 |
| Silica particles | spherical silica | 63.0 | 43 | 63.0 | 43 | 63.0 | 43 |
| Silane coupling agent | γ-GPS | 11.0 | 7 | 11.0 | 7 | 11.0 | 7 |
| Metal chelate compound | AlTA | 1.0 | 0.7 | 1.0 | 0.7 | 1.0 | 0.7 |
| Polymerization initiator | APPI | 11.0 | 7 | 11.0 | 7 | 11.0 | 7 |
| Ultraviolet absorber | UV1 | 10.0 | 7 | 10.0 | 7 | 10.0 | 7 |
| Hydrolysis catalyst | HCl | 2.0 | | 2.0 | | 2.0 | |
| Organic solvent | IPA | 453 | | 452 | | 453 | |
| Organic solvent | MIBK | 302 | | 302 | | 302 | |
| Total | | 1000 | 165 | 1000 | 165 | 1000 | 165 |
| Film thickness [μm] | | 1.5 | | 1.5 | | 1.5 | |
| Underlying layer | | *1 | *2 | *1 | *2 | *1 | *2 |
| Polymerizable monomer | A1-6 | 20.0 | 100 | 20.0 | 100 | 20.0 | 100 |
| Polymerization initiator | APPI | 0.5 | 2 | 0.5 | 2 | 0.5 | 2 |
| Organic solvent | IPA | 784 | | 784 | | 784 | |
| Organic solvent | SBAC | 196 | | 196 | | 196 | |
| Total | | 1000 | 102 | 1000 | 102 | 1000 | 102 |
| Film thickness [μm] | | 0.1 | | 0.1 | | 0.1 | |

*1: Amount incorporated [g],
*2: Solid content ratio [parts by mass]

TABLE 3

|  |  | Example 7 | | Example 8 | | Example 9 | |
| --- | --- | --- | --- | --- | --- | --- | --- |
| Base sheet | | PC | | PC | | PC | |
| Low refractive index layer (n1) | | *1 | *2 | *1 | *2 | *1 | *2 |
| Silicon compound | MTES | 13.0 | 100 | 13.0 | 100 | 18.0 | 100 |
| Silane coupling agent | γ-GPS | 9.0 | 67 | 9.0 | 67 | 4.0 | 25 |
| Metal chelate compound | AlTA | 0.9 | 7 | 0.9 | 7 | 0.4 | 2 |
| Hydrolysis catalyst | HCl | 4.0 | | 4.0 | | 6.0 | |
| Organic solvent | IPA | 973 | | 973 | | 971 | |
| Total | | 1000 | 174 | 1000 | 174 | 1000 | 127 |
| Refractive index | | 1.47 | | 1.47 | | 1.45 | |
| Film thickness [μm] | | 0.1 | | 0.1 | | 0.1 | |
| Medium refractive index layer (n3) | | *1 | *2 | *1 | *2 | *1 | *2 |
| Metal oxide particles | ZrO$_2$ | 19.0 | 80 | 19.0 | 200 | 2.0 | 11 |
| Silane coupling agent | γ-GPS | 5.0 | 20 | 19.0 | 200 | 23.0 | 100 |
| Organic-inorganic composite compound | ASE | 24.0 | 100 | 10.0 | 100 | 23.0 | 100 |
| Metal chelate compound | AlTA | 0.2 | 0.7 | 0.6 | 7 | 0.8 | 3 |
| Hydrolysis catalyst | HCl | 2.0 | | 8.0 | | 8.0 | |
| Organic solvent | PGM | 16.0 | | 16.0 | | 2.0 | |
| Organic solvent | IPA | 280 | | 278 | | 283 | |
| Organic solvent | SBAC | 654 | | 649 | | 658 | |
| Total | | 1000 | 201 | 1000 | 507 | 1000 | 214 |
| Refractive index | | 1.64 | | 1.64 | | 1.52 | |
| Film thickness [μm] | | 0.1 | | 0.1 | | 0.1 | |
| Hard coat layer | | *1 | *2 | *1 | *2 | *1 | *2 |
| Polymerizable monomer | A1-6 | 29.0 | 20 | 15.0 | 10 | 0.0 | 0 |
| Polymerizable monomer | A2-3 | 118.0 | 80 | 132.0 | 90 | 147.0 | 100 |
| Total | | | 100 | | 100 | | 100 |
| Silica particles | spherical silica | 63.0 | 43 | 63.0 | 43 | 63.0 | 43 |
| Silane coupling agent | γ-GPS | 11.0 | 7 | 11.0 | 7 | 11.0 | 7 |
| Metal chelate compound | AlTA | 1.0 | 0.7 | 1.0 | 0.7 | 1.0 | 0.7 |
| Polymerization initiator | APPI | 11.0 | 7 | 11.0 | 7 | 11.0 | 7 |
| Ultraviolet absorber | UV1 | 10.0 | 7 | 10.0 | 7 | 10.0 | 7 |
| Hydrolysis catalyst | HCl | 2.0 | | 2.4 | | 2.4 | |
| Organic solvent | IPA | 453 | | 453 | | 453 | |
| Organic solvent | MIBK | 302 | | 302 | | 302 | |
| Total | | 1000 | 165 | 1000 | 165 | 1000 | 165 |

TABLE 3-continued

|  |  | Example 7 | | Example 8 | | Example 9 | |
| --- | --- | --- | --- | --- | --- | --- | --- |
|  |  | *1 | *2 | *1 | *2 | *1 | *2 |
| Film thickness [μm] |  | 1.5 | | 1.5 | | 1.5 | |
| Underlying layer |  | *1 | *2 | *1 | *2 | *1 | *2 |
| Polymerizable monomer | A1-6 | 20.0 | 100 | 20.0 | 100 | 20.0 | 100 |
| Polymerization initiator | APPI | 0.5 | 2 | 0.5 | 2 | 0.5 | 2 |
| Organic solvent | IPA | 784 | | 784 | | 784 | |
| Organic solvent | SBAC | 196 | | 196 | | 196 | |
| Total |  | 1000 | 102 | 1000 | 102 | 1000 | 102 |
| Film thickness [μm] |  | 0.1 | | 0.1 | | 0.1 | |

*1: Amount incorporated [g],
*2: Solid content ratio [parts by mass]

TABLE 4

|  |  | Example 10 | | Example 11 | | Example 12 | |
| --- | --- | --- | --- | --- | --- | --- | --- |
|  |  | *1 | *2 | *1 | *2 | *1 | *2 |
| Base sheet |  | PC | | PC | | PC | |
| Low refractive index layer (n1) |  | *1 | *2 | *1 | *2 | *1 | *2 |
| Silicon compound | MTES | 13.0 | 100 | 13.0 | 100 | 18.0 | 100 |
| Silane coupling agent | γ-GPS | 9.0 | 67 | 9.0 | 67 | 4.0 | 25 |
| Metal chelate compound | AlTA | 0.9 | 7 | 0.9 | 7 | 0.4 | 2 |
| Hydrolysis catalyst | HCl | 4.0 | | 4.0 | | 6.0 | |
| Organic solvent | IPA | 973 | | 973 | | 971 | |
| Total |  | 1000 | 174 | 1000 | 174 | 1000 | 127 |
| Refractive index |  | 1.47 | | 1.47 | | 1.45 | |
| Film thickness [μm] |  | 0.1 | | 0.1 | | 0.1 | |
| Medium refractive index layer (n3) |  | *1 | *2 | *1 | *2 | *1 | *2 |
| Metal oxide particles | ZrO$_2$ | 10.0 | 50 | 10.0 | 50 | 2.0 | 11 |
| Silane coupling agent | γ-GPS | 19.0 | 100 | 19.0 | 100 | 23.0 | 100 |
| Organic-inorganic composite compound | ASE | 19.0 | 100 | 19.0 | 100 | 23.0 | 100 |
| Metal chelate compound | AlTA | 0.7 | 4 | 0.7 | 4 | 0.7 | 3 |
| Hydrolysis catalyst | HCl | 8.0 | | 8.0 | | 8.0 | |
| Organic solvent | PGM | 8.0 | | 8.0 | | 2.0 | |
| Organic solvent | IPA | 281 | | 281 | | 283 | |
| Organic solvent | SBAC | 654 | | 654 | | 658 | |
| Total |  | 1000 | 254 | 1000 | 254 | 1000 | 214 |
| Refractive index |  | 1.58 | | 1.58 | | 1.52 | |
| Film thickness [μm] |  | 0.1 | | 0.1 | | 0.1 | |
| Hard coat layer |  | *1 | *2 | *1 | *2 | *1 | *2 |
| Polymerizable monomer | A1-6 | 59.0 | 50 | 19.0 | 10 | 13.0 | 10 |
| Polymerizable monomer | A2-3 | 88.0 | 50 | 170.0 | 90 | 113.0 | 90 |
| Total |  |  | 100 | | 100 | | 100 |
| Silica particles | spherical silica | 63.0 | 43 | 21.0 | 11 | 84.0 | 67 |
| Silane coupling agent | γ-GPS | 11.0 | 7 | 11.0 | 6 | 11.0 | 8 |
| Metal chelate compound | AlTA | 1.0 | 0.7 | 1.0 | 0.6 | 1.0 | 0.8 |
| Polymerization initiator | APPI | 11.0 | 7.1 | 11.0 | 6 | 11.0 | 8 |
| Ultraviolet absorber | UV1 | 10.0 | 7.0 | 13.0 | 7 | 9.00 | 7 |
| Hydrolysis catalyst | HCl | 2.0 | | 2.4 | | 2.4 | |
| Organic solvent | IPA | 453 | | 451 | | 454 | |
| Organic solvent | MIBK | 302 | | 301 | | 302 | |
| Total |  | 1000 | 165 | 1000 | 130 | 1000 | 191 |
| Film thickness [μm] |  | 1.5 | | 1.5 | | 1.5 | |
| Underlying layer |  | *1 | *2 | *1 | *2 | *1 | *2 |
| Polymerizable monomer | A1-6 | 20.0 | 100 | 20.0 | 100 | 20.0 | 100 |
| Polymerization initiator | APPI | 0.5 | 2 | 0.5 | 2 | 0.5 | 2 |
| Organic solvent | IPA | 784 | | 784 | | 784 | |
| Organic solvent | SBAC | 196 | | 196 | | 196 | |
| Total |  | 1000 | 102 | 1000 | 102 | 1000 | 102 |
| Film thickness [μm] |  | 0.1 | | 0.1 | | 0.1 | |

*1: Amount incorporated [g],
*2: Solid content ratio [parts by mass]

TABLE 5

|  | Example 13 | | Example 14 | | Example 15 | |
| --- | --- | --- | --- | --- | --- | --- |
| Base sheet | PC | | PC | | PC | |
| Low refractive index layer (n1) | *1 | *2 | *1 | *2 | *1 | *2 |

TABLE 5-continued

|  |  | Example 13 | | Example 14 | | Example 15 | |
| --- | --- | --- | --- | --- | --- | --- | --- |
| Silicon compound | MTES | 13.0 | 100 | 13.0 | 100 | 13.0 | 100 |
| Silane coupling agent | γ-GPS | 9.0 | 67 | 9.0 | 67 | 9.0 | 67 |
| Metal chelate compound | AlTA | 0.9 | 7 | 0.9 | 7 | 0.9 | 7 |
| Hydrolysis catalyst | HCl | 4.0 | | 4.0 | | 4.0 | |
| Organic solvent | IPA | 973 | | 973 | | 973 | |
| Total | | 1000 | 174 | 1000 | 174 | 1000 | 174 |
| Refractive index | | | 1.47 | | 1.47 | | 1.47 |
| Film thickness [μm] | | | 0.1 | | 0.1 | | 0.1 |
| Medium refractive index layer (n3) | | *1 | *2 | *1 | *2 | *1 | *2 |
| Metal oxide particles | ZrO₂ | 10.0 | 50 | 10.0 | 50 | 10.0 | 50 |
| Silane coupling agent | γ-GPS | 19.0 | 100 | 19.0 | 100 | 19.0 | 100 |
| Organic-inorganic composite compound | ASE | 19.0 | 100 | 19.0 | 100 | 19.0 | 100 |
| Metal chelate compound | AlTA | 0.7 | 4 | 0.7 | 4 | 0.7 | 4 |
| Hydrolysis catalyst | HCl | 8.0 | | 8.0 | | 8.0 | |
| Organic solvent | PGM | 8.0 | | 8.0 | | 8.0 | |
| Organic solvent | IPA | 281 | | 281 | | 281 | |
| Organic solvent | SBAC | 654 | | 654 | | 654 | |
| Total | | 1000 | 254 | 1000 | 254 | 1000 | 254 |
| Refractive index | | | 1.58 | | 1.58 | | 1.58 |
| Film thickness [μm] | | | 0.1 | | 0.1 | | 0.1 |
| Hard coat layer | | *1 | *2 | *1 | *2 | *1 | *2 |
| Polymerizable monomer | A1-6 | 15.0 | 10 | 15.0 | 10 | 15.0 | 10 |
| Polymerizable monomer | A2-3 | 132.0 | 90 | 132.0 | 90 | 132.0 | 90 |
| Total | | | 100 | | 100 | | 100 |
| Silica particles | spherical silica | 63.0 | 43 | 63.0 | 43 | 63.0 | 43 |
| Silane coupling agent | γ-GPS | 2.0 | 1 | 21 | 14 | 11.0 | 7 |
| Metal chelate compound | AlTA | 0.2 | 0.1 | 2.0 | 1.4 | 1.0 | 0.7 |
| Polymerization initiator | APPI | 11.0 | 7 | 11.0 | 7 | 11.0 | 7 |
| Ultraviolet absorber | UV1 | 10.0 | 7 | 10.0 | 7 | 10.0 | 7 |
| Hydrolysis catalyst | HCl | 0.5 | | 5.0 | | 2.0 | |
| Organic solvent | IPA | 460 | | 445 | | 453 | |
| Organic solvent | MIBK | 306 | | 296 | | 302 | |
| Total | | 1000 | 159 | 1000 | 172 | 1000 | 165 |
| Film thickness [μm] | | | 1.5 | | 1.5 | | 1.0 |
| Underlying layer | | *1 | *2 | *1 | *2 | *1 | *2 |
| Polymerizable monomer | A1-6 | 20.0 | 100 | 20.0 | 100 | 20.0 | 100 |
| Polymerization initiator | APPI | 0.5 | 2 | 0.5 | 2 | 0.5 | 2 |
| Organic solvent | IPA | 784 | | 784 | | 784 | |
| Organic solvent | SBAC | 196 | | 196 | | 196 | |
| Total | | 1000 | 102 | 1000 | 102 | 1000 | 102 |
| Film thickness [μm] | | | 0.1 | | 0.1 | | 0.1 |

*1: Amount incorporated [g],
*2: Solid content ratio [parts by mass]

TABLE 6

|  |  | Example 16 | | Example 17 | |
| --- | --- | --- | --- | --- | --- |
| Base sheet | | PC | | PC | |
| Low refractive index layer (n1) | | *1 | *2 | *1 | *2 |
| Silicon compound | MTES | 13.0 | 100 | 13.0 | 100 |
| Silane coupling agent | γ-GPS | 9.0 | 67 | 9.0 | 67 |
| Metal chelate compound | AlTA | 0.9 | 7 | 0.9 | 7 |
| Hydrolysis catalyst | HCl | 4.0 | | 4.0 | |
| Organic solvent | IPA | 973 | | 973 | |
| Total | | 1000 | 174 | 1000 | 174 |
| Refractive index | | | 1.47 | | 1.47 |
| Film thickness [μm] | | | 0.1 | | 0.1 |
| Medium refractive index layer (n3) | | *1 | *2 | *1 | *2 |
| Metal oxide particles | ZrO₂ | 10.0 | 50 | 10.0 | 50 |
| Silane coupling agent | γ-GPS | 19.0 | 100 | 19.0 | 100 |
| Organic-inorganic composite compound | ASE | 19.0 | 100 | 19.0 | 100 |
| Metal chelate compound | AlTA | 0.7 | 4 | 0.7 | 4 |
| Hydrolysis catalyst | HCl | 8.0 | | 8.0 | |
| Organic solvent | PGM | 8.0 | | 8.0 | |

TABLE 6-continued

|  |  | Example 16 | | Example 17 | |
|---|---|---|---|---|---|
| Organic solvent | IPA | 281 | | 281 | |
| Organic solvent | SBAC | 654 | | 654 | |
| Total | | 1000 | 254 | 1000 | 254 |
| Refractive index | | | 1.58 | | 1.58 |
| Film thickness [μm] | | | 0.1 | | 0.1 |
| Hard coat layer | | *1 | *2 | *1 | *2 |
| Polymerizable monomer | A1-6 | 15.0 | 10 | 15.0 | 10 |
| Polymerizable monomer | A2-3 | 132.0 | 90 | 132.0 | 90 |
| Total | | | 100 | | 100 |
| Silica particles | spherical silica | 63.0 | 43 | 63.0 | 43 |
| Silane coupling agent | γ-GPS | 11.0 | 7 | 11.0 | 7 |
| Metal chelate compound | AlTA | 1.0 | 0.7 | 1.0 | 0.7 |
| Polymerization initiator | APPI | 11.0 | 7 | 11.0 | 7 |
| Ultraviolet absorber | UV1 | 10.0 | 7 | 10.0 | 7 |
| Hydrolysis catalyst | HCl | 2.0 | | 2.0 | |
| Organic solvent | IPA | 453 | | 453 | |
| Organic solvent | MIBK | 302 | | 302 | |
| Total | | 1000 | 165 | 1000 | 165 |
| Film thickness [μm] | | | 3.0 | | 5.0 |
| Underlying layer | | *1 | *2 | *1 | *2 |
| Polymerizable monomer | A1-6 | 20.0 | 100 | 20.0 | 100 |
| Polymerization initiator | APPI | 0.5 | 2 | 0.5 | 2 |
| Organic solvent | IPA | 784 | | 784 | |
| Organic solvent | SBAC | 196 | | 196 | |
| Total | | 1000 | 102 | 1000 | 102 |
| Film thickness [μm] | | | 0.1 | | 0.1 |

*1: Amount incorporated [g],
*2: Solid content ratio [parts by mass]

Example 18

The formulations of the underlying layer composition, the hard coat layer composition, the medium refractive index layer composition, and the low refractive index layer composition were changed to compositions as shown in Table 7. Moreover, a high refractive index layer having a refractive index of 1.70 and a thickness of 0.1 μm was provided between the medium refractive index layer and the low refractive index layer, with its formulation being as shown in Table 7. Except for these conditions, a transparent resin substrate was prepared in the same manner as in Example 1. The results are shown in Table 8.

TABLE 7

|  |  | Example 18 | |
|---|---|---|---|
| Base sheet | | PC | |
| Low refractive index layer (n1) | | *1 | *2 |
| Silicon compound | MTES | 18.0 | 100 |
| Silane coupling agent | γ-GPS | 4.0 | 67 |
| Metal chelate compound | AlTA | 0.4 | 7 |
| Hydrolysis catalyst | HCl | 6.0 | |
| Organic solvent | IPA | 971 | |
| Total | | 1000 | 174 |
| Refractive index | | | 1.45 |
| Film thickness [μm] | | | 0.1 |
| High refractive index layer (n2) | | *1 | *2 |
| Metal oxide particles | ZrO$_2$ particles | 19.0 | 100 |
| Silane coupling agent | 3-GPDS | 15.0 | 82 |

TABLE 7-continued

|  |  | Example 18 | |
|---|---|---|---|
| Metal chelate compound | AlTA | 1.0 | 6 |
| Hydrolysis catalyst | HCl | 4.0 | |
| Organic solvent | PGM | 15.0 | |
| Organic solvent | IPA | 284 | |
| Organic solvent | SBAC | 662 | |
| Total | | 1000 | 188 |
| Refractive index | | | 1.70 |
| Film thickness [μm] | | | 0.1 |
| Medium refractive index layer (n3) | | *1 | *2 |
| Metal oxide particles | ZrO$_2$ particles | 2.0 | 11 |
| Silane coupling agent | γ-GPS | 23.0 | 100 |
| Organic-inorganic composite compound | ASE | 23.0 | 100 |
| Metal chelate compound | AlTA | 0.8 | 3 |
| Hydrolysis catalyst | HCl | 8.0 | |
| Organic solvent | PGM | 2.0 | |
| Organic solvent | IPA | 282 | |
| Organic solvent | SBAC | 659 | |
| Total | | 1000 | 214 |
| Refractive index | | | 1.52 |
| Film thickness [μm] | | | 0.1 |
| Hard coat layer | | *1 | *2 |
| Polymerizable monomer | A1-6 | 15.0 | 10 |
| Polymerizable monomer | A2-3 | 132.0 | 90 |
| Total | | | 100 |
| Silica particles | spherical silica | 63.0 | 43 |
| Silane coupling agent | γ-GPS | 2.0 | 1 |

TABLE 7-continued

|  |  | Example 18 | |
|---|---|---|---|
| Metal chelate compound | AlTA | 0.2 | 0.1 |
| Polymerization initiator | APPI | 11.0 | 7 |
| Ultraviolet absorber | UV1 | 10.0 | 7 |
| Hydrolysis catalyst | HCl | 0.5 | |
| Organic solvent | IPA | 460 | |
| Organic solvent | MIBK | 306 | |
| Total |  | 1000 | 106 |
| Film thickness [μm] |  | 1.5 | |

TABLE 7-continued

|  |  | Example 18 | |
|---|---|---|---|
| Underlying layer |  | *1 | *2 |
| Polymerizable monomer | A1-6 | 20.0 | 100 |
| Polymerization initiator | APPI | 0.5 | 2 |
| Organic solvent | IPA | 784 | |
| Organic solvent | SBAC | 196 | |
| Total |  | 1000 | 102 |
| Film thickness [μm] |  | 0.1 | |

*1: Amount incorporated [g]
*2: Solid content ratio [parts by mass]

TABLE 8

|  | Ex. 1 | Ex. 2 | Ex. 3 | Ex. 4 | Ex. 5 | Ex. 6 |
|---|---|---|---|---|---|---|
| Elongation rate | 140% | 150% | 155% | 130% | 140% | 150% |
| Total light transmittance | 97.10% | 95.80% | 95.80% | 96.70% | 95.40% | 95.40% |
| Refractive index | 2.90% | 4.20% | 4.20% | 3.30% | 4.60% | 4.60% |
| Hardness | 2B | 2B | 2B | 2B | 2B | 2B |
| Abrasion resistance | ○ | ○ | Δ | ⊚ | ○ | ○ |
| Thermal shapability | ○ | ○ | ○ | ○ | ○ | ○ |

|  | Ex. 7 | Ex. 8 | Ex. 9 | Ex. 10 | Ex. 11 | Ex. 12 |
|---|---|---|---|---|---|---|
| Elongation rate | 140% | 150% | 160% | 120% | 150% | 145% |
| Total light transmittance | 98.60% | 98.60% | 95.80% | 97.10% | 97.10% | 95.80% |
| Refractive index | 1.40% | 1.40% | 4.20% | 2.90% | 2.90% | 4.20% |
| Hardness | 2B | 2B | 2B | 2B | 2B | 2B |
| Abrasion resistance | ○ | ○ | ○ | ○ | ○ | ○ |
| Thermal shapability | ○ | ○ | ○ | ○ | ○ | ○ |

|  | Ex. 13 | Ex. 14 | Ex. 15 | Ex. 16 | Ex. 17 | Ex. 18 |
|---|---|---|---|---|---|---|
| Elongation rate | 150% | 150% | 150% | 135% | 120% | 150% |
| Total light transmittance | 97.10% | 97.10% | 97.10% | 97.10% | 97.10% | 99.00% |
| Refractive index | 2.90% | 2.90% | 2.90% | 2.90% | 2.90% | 1.00% |
| Hardness | 2B | 2B | 2B | 2B | B | 2B |
| Abrasion resistance | ○ | ○ | Δ | ○ | ○ | ○ |
| Thermal shapability | ○ | ○ | ○ | ○ | ○ | ○ |

Comparative Examples 1 to 12

Transparent resin substrates were prepared in the same manner as in Example 1, except that the formulations of the underlying layer composition, the hard coat layer composition, the medium refractive index layer composition, and the low refractive index layer composition were changed to compositions as shown in Tables 9 to 12. The results are shown in Table 13.

TABLE 9

|  |  | Comp. Ex. 1 | | Comp. Ex. 2 | | Comp. Ex. 3 | |
|---|---|---|---|---|---|---|---|
| Base sheet |  | PC | | PC | | PC | |
| Low refractive index layer (n1) |  | *1 | *2 | *1 | *2 | *1 | *2 |
| Silicon compound | MTES | 21.0 | 100 | 3.0 | 100 | 13.0 | 100 |
| Silane coupling agent | γ-GPS | 1.0 | 5 | 19.0 | 566 | 9.0 | 67 |
| Metal chelate compound | AlTA | 0.7 | 3 | 0.7 | 21 | 0.7 | 7 |
| Hydrolysis catalyst | HCl | 6.0 | | 6.0 | | 6.0 | |
| Organic solvent | IPA | 971 | | 971 | | 971 | |
| Total |  | 1000 | 108 | 1000 | 687 | 1000 | 174 |
| Refractive index |  | 1.44 | | 1.51 | | 1.47 | |
| Film thickness [μm] |  | 0.1 | | 0.1 | | 0.1 | |
| Medium refractive index layer (n3) |  | *1 | *2 | *1 | *2 | *1 | *2 |
| Metal oxide particles | ZrO$_2$ | 0.5 | 2 | 14.0 | 86 | 34.0 | 350 |
| Silane coupling agent | γ-GPS | 24.0 | 100 | 17.0 | 100 | 5.0 | 50 |
| Organic-inorganic composite compound | ASE | 24.0 | 100 | 17.0 | 100 | 10.0 | 100 |
| Metal chelate compound | AlTA | 0.8 | 4 | 0.6 | 4 | 0.7 | 8 |
| Hydrolysis catalyst | HCl | 8.0 | | 5.0 | | 8.0 | |

TABLE 9-continued

|  |  | Comp. Ex. 1 | | Comp. Ex. 2 | | Comp. Ex. 3 | |
| --- | --- | --- | --- | --- | --- | --- | --- |
| Organic solvent | PGM | 0.4 | | 12.0 | | 8.0 | |
| Organic solvent | IPA | 283 | | 280 | | 281 | |
| Organic solvent | SBAC | 659 | | 654 | | 653 | |
| Total | | 1000 | 206 | 1000 | 290 | 1000 | 508 |
| Refractive index | | 1.51 | | 1.61 | | 1.70 | |
| Film thickness [μm] | | 0.1 | | 0.1 | | 0.1 | |
| Hard coat layer | | *1 | *2 | *1 | *2 | *1 | *2 |
| Polymerizable monomer | A1-6 | 8.0 | 5 | 44.0 | 30 | 29.0 | 20 |
| Polymerizable monomer | A2-3 | 140.0 | 95 | 103.0 | 70 | 118.0 | 80 |
| Total | | | 100 | | 100 | | 100 |
| Silica particles | spherical silica | 63.0 | 43 | 63.0 | 43 | 63.0 | 43 |
| Silane coupling agent | γ-GPS | 11.0 | 7 | 11.0 | 7 | 11.0 | 7 |
| Metal chelate compound | AlTA | 1.0 | 0.7 | 1.0 | 0.7 | 1.0 | 0.7 |
| Polymerization initiator | APPI | 11.0 | 7 | 11.0 | 7 | 11.0 | 7 |
| Ultraviolet absorber | UV1 | 10.0 | 7 | 10.0 | 7 | 10.0 | 7 |
| Hydrolysis catalyst | HCl | 2.0 | | 2.0 | | 2.4 | |
| Organic solvent | IPA | 452 | | 453 | | 453 | |
| Organic solvent | MIBK | 302 | | 302 | | 302 | |
| Total | | 1000 | 165 | 1000 | 165 | 1000 | 165 |
| Film thickness [μm] | | 1.5 | | 1.5 | | 1.5 | |
| Underlying layer | | *1 | *2 | *1 | *2 | *1 | *2 |
| Polymerizable monomer | A1-6 | 20.0 | 100 | 20.0 | 100 | 20.0 | 100 |
| Polymerization initiator | APPI | 0.5 | 2 | 0.5 | 2 | 0.5 | 2 |
| Organic solvent | IPA | 784 | | 784 | | 784 | |
| Organic solvent | SBAC | 196 | | 196 | | 196 | |
| Total | | 1000 | 102 | 1000 | 102 | 1000 | 102 |
| Film thickness [μm] | | 0.1 | | 0.1 | | 0.1 | |

*1: Amount incorporated [g],
*2: Solid content ratio [parts by mass]

TABLE 10

|  |  | Comp. Ex. 4 | | Comp. Ex. 5 | | Comp. Ex. 6 | |
| --- | --- | --- | --- | --- | --- | --- | --- |
| Base sheet | | PC | | PC | | PC | |
| Low refractive index layer (n1) | | *1 | *2 | *1 | *2 | *1 | *2 |
| Silicon compound | MTES | 18.0 | 100 | 20.0 | 100 | 18.0 | 100 |
| Silane coupling agent | γ-GPS | 4.0 | 67 | 2.0 | 11 | 4.0 | 67 |
| Metal chelate compound | AlTA | 0.4 | 7 | 0.2 | 1 | 0.4 | 7 |
| Hydrolysis catalyst | HCl | 6.0 | | 6.0 | | 6.0 | |
| Organic solvent | IPA | 972 | | 972 | | 972 | |
| Total | | 1000 | 174 | 1000 | 112 | 1000 | 174 |
| Refractive index | | 1.45 | | 1.44 | | 1.45 | |
| Film thickness [μm] | | 0.1 | | 0.1 | | 0.1 | |
| Medium refractive index layer (n3) | | *1 | *2 | *1 | *2 | *1 | *2 |
| Metal oxide particles | ZrO₂ | 5.0 | 100 | 2.0 | 6 | 2.0 | 11 |
| Silane coupling agent | γ-GPS | 38.0 | 800 | 2.0 | 6 | 23.0 | 100 |
| Organic-inorganic composite compound | ASE | 5.0 | 100 | 43.0 | 100 | 23.0 | 100 |
| Metal chelate compound | AlTA | 0.7 | 15 | 0.7 | 2 | 0.8 | 3 |
| Hydrolysis catalyst | HCl | 8.0 | | 8.0 | | 8.0 | |
| Organic solvent | PGM | 8.0 | | 8.0 | | 2.0 | |
| Organic solvent | IPA | 281 | | 281 | | 282 | |
| Organic solvent | SBAC | 654 | | 655 | | 659 | |
| Total | | 1000 | 1015 | 1000 | 113 | 1000 | 214 |
| Refractive index | | 1.54 | | 1.52 | | 1.52 | |
| Film thickness [μm] | | 0.1 | | 0.1 | | 0.1 | |
| Hard coat layer | | *1 | *2 | *1 | *2 | *1 | *2 |
| Polymerizable monomer | A1-6 | 15.0 | 10 | 7.0 | 5 | 147.0 | 100 |
| Polymerizable monomer | A2-3 | 132.0 | 90 | 140.0 | 95 | 0.0 | 0 |
| Total | | | 100 | | 100 | | 100 |
| Silica particles | spherical silica | 63.0 | 43 | 63.0 | 43 | 63.0 | 43 |
| Silane coupling agent | γ-GPS | 11.0 | 7 | 11.0 | 7 | 11.0 | 7 |
| Metal chelate compound | AlTA | 1.0 | 0.7 | 1.0 | 0.7 | 1.0 | 0.7 |
| Polymerization initiator | APPI | 11.0 | 7 | 11.0 | 7 | 11.0 | 7 |
| Ultraviolet absorber | UV1 | 10.0 | 7 | 10.0 | 7 | 10.0 | 7 |
| Hydrolysis catalyst | HCl | 2.0 | | 2.0 | | 2.0 | |

TABLE 10-continued

|  |  | Comp. Ex. 4 | | Comp. Ex. 5 | | Comp. Ex. 6 | |
| --- | --- | --- | --- | --- | --- | --- | --- |
| Organic solvent | IPA | 453 | | 453 | | 453 | |
| Organic solvent | MIBK | 302 | | 302 | | 302 | |
| Total | | 1000 | 165 | 1000 | 165 | 1000 | 165 |
| Film thickness [μm] | | | 1.5 | | 1.5 | | 1.5 |
| Underlying layer | | *1 | *2 | *1 | *2 | *1 | *2 |
| Polymerizable monomer | A1-6 | 20.0 | 100 | 20.0 | 100 | 20.0 | 100 |
| Polymerization initiator | APPI | 0.5 | 2 | 0.5 | 2 | 0.5 | 2 |
| Organic solvent | IPA | 784 | | 784 | | 784 | |
| Organic solvent | SBAC | 196 | | 196 | | 196 | |
| Total | | 1000 | 102 | 1000 | 102 | 1000 | 102 |
| Film thickness [μm] | | | 0.1 | | 0.1 | | 0.1 |

*1: Amount incorporated [g],

*2: Solid content ratio [parts by mass]

TABLE 11

|  |  | Comp. Ex. 7 | | Comp. Ex. 8 | | Comp. Ex. 9 | |
| --- | --- | --- | --- | --- | --- | --- | --- |
| Base sheet | | PC | | PC | | PC | |
| Low refractive index layer (n1) | | *1 | *2 | *1 | *2 | *1 | *2 |
| Silicon compound | MTES | 9.0 | 100 | 13.0 | 100 | 13.0 | 100 |
| Silane coupling agent | γ-GPS | 13.0 | 150 | 9.0 | 67 | 9.0 | 67 |
| Metal chelate compound | AlTA | 0.7 | 8 | 0.7 | 7 | 0.7 | 7 |
| Hydrolysis catalyst | HCl | 6.0 | | 6.0 | | 6.0 | |
| Organic solvent | IPA | 971 | | 971 | | 971 | |
| Total | | 1000 | 258 | 1000 | 174 | 1000 | 174 |
| Refractive index | | | 1.47 | | 1.47 | | 1.47 |
| Film thickness [μm] | | | 0.1 | | 0.1 | | 0.1 |
| Medium refractive index layer (n3) | | *1 | *2 | *1 | *2 | *1 | *2 |
| Metal oxide particles | ZrO$_2$ | 10.0 | 50 | 10.0 | 50 | 10.0 | 50 |
| Silane coupling agent | γ-GPS | 19.0 | 100 | 19.0 | 100 | 19.0 | 100 |
| Organic-inorganic composite compound | ASE | 19.0 | 100 | 19.0 | 100 | 19.0 | 100 |
| Metal chelate compound | AlTA | 0.7 | 4 | 0.7 | 4 | 0.7 | 4 |
| Hydrolysis catalyst | HCl | 8.0 | | 8.0 | | 8.0 | |
| Organic solvent | PGM | 8.0 | | 8.0 | | 8.0 | |
| Organic solvent | IPA | 281 | | 281 | | 281 | |
| Organic solvent | SBAC | 654 | | 654 | | 654 | |
| Total | | 1000 | 254 | 1000 | 254 | 1000 | 254 |
| Refractive index | | | 1.58 | | 1.58 | | 1.58 |
| Film thickness [μm] | | | 0.1 | | 0.1 | | 0.1 |
| Hard coat layer | | *1 | *2 | *1 | *2 | *1 | *2 |
| Polymerizable monomer | A1-6 | 96.0 | 65 | 21.0 | 10 | 8.0 | 10 |
| Polymerizable monomer | A2-3 | 52.0 | 35 | 189.0 | 90 | 76.0 | 90 |
| Total | | | 100 | | 100 | | 100 |
| Silica particles | spherical silica | 63.0 | 43 | 0.0 | 0 | 126.0 | 150 |
| Silane coupling agent | γ-GPS | 11.0 | 7 | 10.5 | 5 | 11.0 | 13 |
| Metal chelate compound | AlTA | 1.0 | 0.7 | 1.0 | 0.5 | 1.00 | 1.3 |
| Polymerization initiator | APPI | 11.0 | 7 | 11.0 | 7 | 11.0 | 7 |
| Ultraviolet absorber | UV1 | 10.0 | 7 | 10.0 | 7 | 6.0 | 7 |
| Hydrolysis catalyst | HCl | 2.0 | | 2.0 | | 2.0 | |
| Organic solvent | IPA | 452 | | 454 | | 455 | |
| Organic solvent | MIBK | 302 | | 301 | | 304 | |
| Total | | 1000 | 165 | 1000 | 120 | 1000 | 278 |
| Film thickness [μm] | | | 1.5 | | 1.5 | | 1.5 |
| Underlying layer | | *1 | *2 | *1 | *2 | *1 | *2 |
| Polymerizable monomer | A1-6 | 20.0 | 100 | 20.0 | 100 | 20.0 | 100 |
| Polymerization initiator | APPI | 0.5 | 2 | 0.5 | 2 | 0.5 | 2 |
| Organic solvent | IPA | 784 | | 784 | | 784 | |
| Organic solvent | SBAC | 196 | | 196 | | 196 | |
| Total | | 1000 | 102 | 1000 | 102 | 1000 | 102 |
| Film thickness [μm] | | | 0.1 | | 0.1 | | 0.1 |

*1: Amount incorporated [g],

*2: Solid content ratio [parts by mass]

TABLE 12

|  |  | Comp. Ex. 10 | | Comp. Ex. 11 | | Comp. Ex. 12 | |
| --- | --- | --- | --- | --- | --- | --- | --- |
| Base sheet |  | PC | | PC | | PC | |
| Low refractive index layer (n1) |  | *1 | *2 | *1 | *2 | *1 | *2 |
| Silicon compound | MTES | 13.0 | 100 | 13.0 | 100 | 13.0 | 100 |
| Silane coupling agent | γ-GPS | 9.0 | 67 | 9.0 | 67 | 9.0 | 67 |
| Metal chelate compound | AlTA | 0.7 | 7 | 0.7 | 7 | 0.7 | 7 |
| Hydrolysis catalyst | HCl | 6.0 |  | 6.0 |  | 6.0 |  |
| Organic solvent | IPA | 971 |  | 971 |  | 971 |  |
| Total |  | 1000 | 174 | 1000 | 174 | 1000 | 174 |
| Refractive index |  | 1.47 | | 1.47 | | 1.47 | |
| Film thickness [μm] |  | 0.1 | | 0.1 | | 0.1 | |
| Medium refractive index layer (n3) |  | *1 | *2 | *1 | *2 | *1 | *2 |
| Metal oxide particles | ZrO₂ | 10.0 | 50 | 10.0 | 50 | 10.0 | 50 |
| Silane coupling agent | γ-GPS | 19.0 | 100 | 19.0 | 100 | 19.0 | 100 |
| Organic-inorganic composite compound | ASE | 19.0 | 100 | 19.0 | 100 | 19.0 | 100 |
| Metal chelate compound | AlTA | 0.7 | 4 | 0.7 | 4 | 0.7 | 4 |
| Hydrolysis catalyst | HCl | 8.0 |  | 8.0 |  | 8.0 |  |
| Organic solvent | PGM | 8.0 |  | 8.0 |  | 8.0 |  |
| Organic solvent | IPA | 281 |  | 281 |  | 281 |  |
| Organic solvent | SBAC | 654 |  | 654 |  | 654 |  |
| Total |  | 1000 | 254 | 1000 | 254 | 1000 | 254 |
| Refractive index |  | 1.58 | | 1.58 | | 1.58 | |
| Film thickness [μm] |  | 0.1 | | 0.1 | | 0.1 | |
| Hard coat layer |  | *1 | *2 | *1 | *2 | *1 | *2 |
| Polymerizable monomer | A1-6 | 15.0 | 10 | 15.0 | 10 | 15.0 | 10 |
| Polymerizable monomer | A2-3 | 132.0 | 90 | 132.0 | 90 | 132.0 | 90 |
| Total |  |  | 100 |  | 100 |  | 100 |
| Silica particles | spherical silica | 63.0 | 43 | 63.0 | 43 | 63.0 | 43 |
| Silane coupling agent | γ-GPS | 48.0 | 33 | 11.0 | 7 | 11.0 | 7 |
| Metal chelate compound | AlTA | 5.0 | 0.7 | 1.0 | 0.7 | 1.00 | 0.7 |
| Polymerization initiator | APPI | 11.0 | 7 | 11.0 | 7 | 11.0 | 7 |
| Ultraviolet absorber | UV1 | 10.0 | 7 | 10.0 | 7 | 10.0 | 7 |
| Hydrolysis catalyst | HCl | 8.0 |  | 2.0 |  | 2.0 |  |
| Organic solvent | IPA | 425 |  | 453 |  | 453 |  |
| Organic solvent | MIBK | 283 |  | 302 |  | 302 |  |
| Total |  | 1000 | 190 | 1000 | 165 | 1000 | 165 |
| Film thickness [μm] |  | 1.5 | | 0.5 | | 8.0 | |
| Underlying layer |  | *1 | *2 | *1 | *2 | *1 | *2 |
| Polymerizable monomer | A1-6 | 20.0 | 100 | 20.0 | 100 | 20.0 | 100 |
| Polymerization initiator | APPI | 0.5 | 2 | 0.5 | 2 | 0.5 | 2 |
| Organic solvent | IPA | 784 |  | 784 |  | 784 |  |
| Organic solvent | SBAC | 196 |  | 196 |  | 196 |  |
| Total |  | 1000 | 102 | 1000 | 102 | 1000 | 102 |
| Film thickness [μm] |  | 0.1 | | 0.1 | | 0.1 | |

*1: Amount incorporated [g],
*2: Solid content ratio [parts by mass]

TABLE 13

|  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| Elongation rate | 155% | 130% | 140% | 115% | 155% | 102% |
| Total light transmittance | 95.80% | 95.70% | 99.50% | 96.50% | 96.10% | 95.80% |
| Refractive index | 4.20% | 3.70% | 0.50% | 3.50% | 3.90% | 4.20% |
| Hardness | 2B | 2B | 2B | 2B | 2B | B |
| Abrasion resistance | X | ◯ | X | ◯ | X | ◯ |
| Thermal shapability | ◯ | ◯ | ◯ | X | ◯ | X |

|  | Comp. Ex. 7 | Comp. Ex. 8 | Comp. Ex. 9 | Comp. Ex. 10 | Comp. Ex. 11 | Comp. Ex. 12 |
| --- | --- | --- | --- | --- | --- | --- |
| Elongation rate | 110% | 150% | 115% | 150% | 155% | 105% |
| Total light transmittance | 97.10% | 97.10% | 97.10% | 97.10% | 97.10% | 97.10% |
| Refractive index | 2.90% | 2.90% | 2.90% | 2.90% | 2.90% | 2.90% |
| Hardness | B | 2B | 2B | 2B | 3B | B |
| Abrasion resistance | ◯ | ◯ | ◯ | ◯ | X | ◯ |
| Thermal shapability | X | ◯ | X | ◯ | ◯ | X |

Comparative Example 1 is a case where the content of the silane coupling agent in the low refractive index layer was excessively low, and the abrasion resistance was inferior. Comparative Example 2 is a case where the content of the silane coupling agent in the low refractive index layer was excessively high, and the various physical properties were satisfactory, but blushing occurred. Comparative Example 3 is a case where the content of the metal oxide in the medium refractive index layer was excessively high, and the antireflective capability was superior, but the abrasion resistance was inferior. Comparative Example 4 is a case where the content of the silane coupling agent in the medium refractive index layer was excessively high, so that the elongation rate was low, and the thermal shapability was inferior. Comparative Example 5 is a case where the content of the silane coupling agent in the medium refractive index layer was excessively low, and the abrasion resistance was inferior. Comparative Example 6 is a case where the 3-urethane acrylate was not contained in the hard coat layer, so that the elongation rate was very low, and the thermal shapability was inferior. Comparative Example 7 is a case where the content of the 3-urethane acrylate in the hard coat layer was low, so that the elongation rate was low, and the thermal shapability was inferior. Comparative Example 8 is a case where the silica particles were not contained in the hard coat layer, and the various physical properties were satisfactory, but blushing occurred. Comparative Example 9 is a case where excess silica particles were contained in the hard coat layer, and the abrasion resistance was inferior. Comparative Example 10 is a case where an excess of the silane coupling agent was contained in the hard coat layer, and the various physical properties were satisfactory, but blushing occurred. Comparative Example 11 is a case where the thickness of the hard coat layer was extremely small, so that the abrasion resistance and the hardness were inferior. Comparative Example 12 is a case where the thickness of the hard coat layer was extremely large, so that the elongation rate was low, and the thermal shapability was inferior.

The invention claimed is:

1. A transparent resin substrate composed of a light-transmitting resin base sheet, an underlying layer formed on the base sheet, a hard coat layer formed on the underlying layer, and an antireflection coating formed on the hard coat layer, wherein
the antireflection coating comprises a medium refractive index layer and a low refractive index layer formed on the field-of view side of the medium refractive index layer,
the underlying layer is composed of a cured product obtained by curing (A1) a hexa- or higher functional urethane acrylate monomer,
the hard coat layer is composed of a cured product formed by curing a hard coat layer composition which contains (A) a polymerizable monomer containing 50% by mass or more of (A2) a tri- or lower functional urethane acrylate monomer, (B) silica particles, (C) a silane coupling agent, and (D) a metal chelate compound,
the medium refractive index layer is composed of a cured product formed by curing a medium refractive index layer composition which contains (E) an organic-inorganic composite compound, (F) metal oxide particles, (C) a silane coupling agent, and (D) a metal chelate compound, and
the low refractive index layer is composed of a particle-free cured product formed by curing a low refractive index layer composition which contains (G) a silicon compound represented by the following general formula

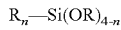

where
R is an alkyl group or an alkenyl group, and
n is a number 1 or 2,
(C) a silane coupling agent, and (D) a metal chelate compound.

2. The transparent resin substrate according to claim 1, wherein
the antireflection coating has a high refractive index layer between the medium refractive index layer and the low refractive index layer, and
the high refractive index layer is composed of a cured product formed by curing a high refractive index layer composition which contains (F) metal oxide particles, (C) a silane coupling agent, and (D) a metal chelate compound.

3. The transparent resin substrate according to claim 1, wherein
the hard coat layer composition contains 10 to 70 parts by mass of the silica particles (B), 1 to 10 parts by mass of the silane coupling agent (C), and 0.1 to 1.5 parts by mass of the metal chelate compound (D), based on 100 parts by mass of the polymerizable monomer (A),
the medium refractive index layer composition contains 1 to 200 parts by mass of the metal oxide particles (F), 10 to 400 parts by mass of the silane coupling agent (C), and 0.1 to 15 parts by mass of the metal chelate compound (D), based on 100 parts by mass of the organic-inorganic composite compound (E), and
the low refractive index layer composition contains 10 to 400 parts by mass of the silane coupling agent (C), and 1 to 20 parts by mass of the metal chelate compound (D), based on 100 parts by mass of the silicon compound (G).

4. The transparent resin substrate according to claim 1, wherein
a thickness of the light-transmitting resin base sheet is 30 to 1000 μm,
a thickness of the underlying layer is 0.05 to 0.15 μm,
a thickness of the hard coat layer is 1 to 5 μm,
a thickness of the medium refractive index layer is 0.05 to 0.15 μm, and
a thickness of the low refractive index layer is 0.05 to 0.15 μm.

5. The transparent resin substrate according to claim 1, wherein
a refractive index of the medium refractive index layer is 1.51 to 1.75, and
a refractive index of the low refractive index layer is 1.40 to 1.50.

6. The transparent resin substrate according to claim 1, wherein the light-transmitting resin base sheet is a base sheet selected from a polycarbonate resin sheet, an acrylate resin sheet, and a sheet being a laminate of a polycarbonate resin and an acrylate resin.

7. The transparent resin substrate according to claim 1, wherein an elongation rate of the transparent resin substrate is 120 to 160%.

8. The transparent resin substrate according to claim 1, wherein the organic-inorganic composite compound (E) is a composite compound having a structure in which an alkoxysilyl group is bound to a bisphenol A epoxy compound, a novolak phenol compound, or a polyamic acid compound.

9. An antireflection film for film insert molding which is composed of the transparent resin substrate according to claim 1.

\* \* \* \* \*